US012628143B2

(12) United States Patent
Pu et al.

(10) Patent No.: US 12,628,143 B2
(45) Date of Patent: May 12, 2026

(54) TERMINAL, SYSTEM, AND METHOD FOR BANDWIDTH PART OUT-OF-SYNC DETECTION AND RECOVERY

(71) Applicant: Apple Inc., Cupertino, CA (US)

(72) Inventors: Han Pu, Shanghai (CN); Lijie Zhang, Beijing (CN); Alosious Pradeep Prabhakar, Singapore (SG); Lele Cui, Beijing (CN); Kai Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 321 days.

(21) Appl. No.: 18/468,090

(22) Filed: Sep. 15, 2023

(65) Prior Publication Data

US 2024/0098720 A1     Mar. 21, 2024

Related U.S. Application Data

(60) Provisional application No. 63/376,553, filed on Sep. 21, 2022.

(51) Int. Cl.
| | |
|---|---|
| *H04W 72/0453* | (2023.01) |
| *H04L 5/00* | (2006.01) |
| *H04W 36/06* | (2009.01) |
| *H04W 36/24* | (2009.01) |
| *H04W 72/232* | (2023.01) |

(52) U.S. Cl.
CPC ......... *H04W 72/0453* (2013.01); *H04L 5/001* (2013.01); *H04L 5/0094* (2013.01); *H04W 36/06* (2013.01); *H04W 36/249* (2023.05); *H04W 72/232* (2023.01)

(58) Field of Classification Search
None
See application file for complete search history.

(56) References Cited

U.S. PATENT DOCUMENTS

| | | | | |
|---|---|---|---|---|
| 2017/0295511 A1* | 10/2017 | Sebire | .................. | H04W 72/04 |
| 2019/0222404 A1* | 7/2019 | Ang | ...................... | H04L 5/0041 |
| 2019/0349142 A1* | 11/2019 | Aiba | ..................... | H04L 1/1819 |
| 2020/0170046 A1* | 5/2020 | Agiwal | .................. | H04L 5/001 |
| 2020/0259627 A1* | 8/2020 | Loehr | .................. | H04L 5/0098 |

* cited by examiner

*Primary Examiner* — Jay L Vogel
(74) *Attorney, Agent, or Firm* — Blank Rome LLP

(57) ABSTRACT

A terminal may include configured to receive, from a network, multiple downlink signals. The terminal may include a processor configured to identify, from the downlink signals, at least one configuration parameter including a bandwidth part switching indicator. The processor may then identify at least one resource from a target bandwidth part indicated by the bandwidth part switching indicator. The processor may then determine a bandwidth part mismatch based on whether a signal is received using the at least one resource from the target bandwidth part.

14 Claims, 10 Drawing Sheets

TERMINAL, SYSTEM, AND METHOD FOR BANDWIDTH PART OUT-OF-SYNC DETECTION AND RECOVERY

FIELD

The present application relates to wireless devices and wireless networks, including devices, circuits, and methods for performing communication procedures in specific Bandwidth Parts (BWPs).

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS) and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), and BLUETOOTH™, among others.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including the fifth generation (5G) standard and New Radio (NR) communication technologies. Accordingly, improvements in the field in support of such development and design are desired.

SUMMARY

According to one or more embodiments, a terminal includes a receiver configured to receive, from a network, multiple downlink signals. The terminal includes a processor configured to identify, from the downlink signals, at least one configuration parameter including a bandwidth part switching indicator. The processor may then identify at least one resource from a target bandwidth part indicated by the bandwidth part switching indicator. The processor then determines a bandwidth part mismatch based on whether a signal is received using the at least one resource from the target bandwidth part.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter may be obtained when the following detailed description of various aspects is considered in conjunction with the following drawings.

Figure 1:
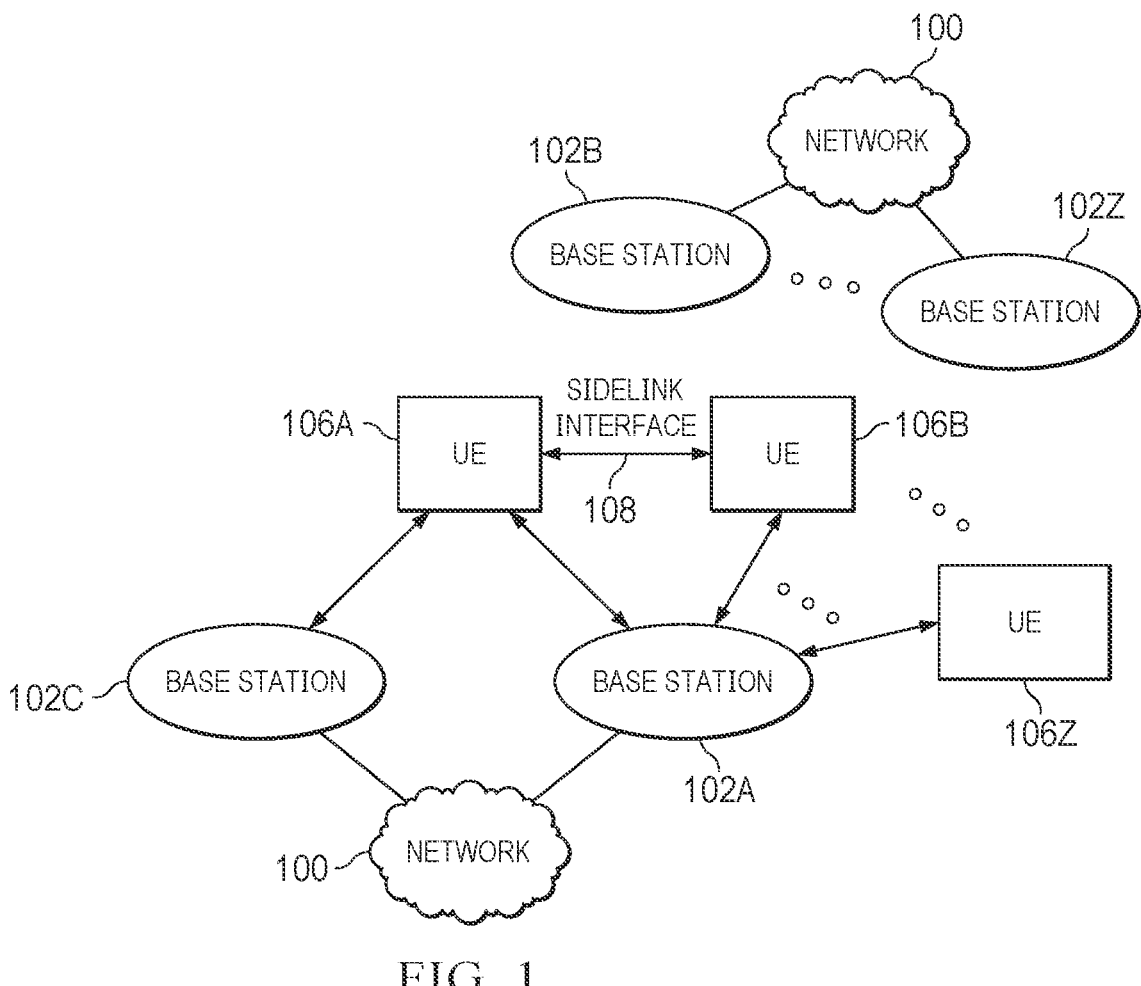
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

There is a need to study and evaluate enabling detection and recovery of Bandwidth Part (BWP) out-of-sync in 5G/New Radio (NR) environments. Thus, disclosed herein are various solutions for correcting mismatches resulting from BWP switching, including: 1) using timer based algorithms; 2) using specific service information; and 3) using Scheduling Request (SR) resources and/or Random Access Channel (RACH) resources.

In accordance with one or more embodiments, a user equipment (UE) device or terminal communicating with other terminals (other wireless communication devices, network devices, UE devices, and/or Base Station (BS) devices) may perform bandwidth adaptation procedures. The procedures may include adjusting an operational bandwidth for the terminal based on one or more configuration parameters received via higher layer signaling.

The configuration parameters may cause the terminal to change into a specific BWP based on an activity level (e.g., shrink during a period of low activity to save power), to increase a frequency range, and/or to use different services (e.g., by changing a subcarrier spacing (SCS)).

In one or more embodiments, the terminal is configured to perform specific operations/communicate using the BWP. In some embodiments, the BWP is a contiguous set of physical resource blocks (PRBs) in a radio transmission, selected from a contiguous subset of common resource blocks (RBs) for a given numerology ($\mu$) on a given carrier configured for a specific communication procedure. Each BWP may be defined for the given numerology ($\mu$) in relation to the SCS, a symbol duration, and/or a cyclic prefix (CP) length. The terminal may be configured with four BWPs for downlink and uplink. One of the BWPs may be active for downlink or uplink at any point in time. The BWP resources may be preconfigured (e.g., configured from factory settings) or dynamically configured (e.g., configured from a core network via a BS device or a UE device).

There may be mismatches when the terminal attempts to transition from one BWP to another. For example, a mismatch may occur when a terminal is caused to switch from an original BWP to a target BWP that is not configured to receive the terminal. The second BWP may not be configured to receive the terminal in cases where higher layer signaling was not able to schedule Downlink(DL)/Uplink (UL) communications for the terminal in the second BWP by the time the terminal performs a switching operation.

In one or more embodiments, the terminal may be configured to monitor and detect when a mismatch occurs. Upon identifying a mismatch, the terminal may implement a recovery operation to return to the original BWP.

In some embodiments, to identify the mismatch, the terminal may identify a detection window to determine whether switching was successful. Depending on an operation of the terminal when the BWP switch occurs, the terminal may confirm whether BWP switching was successful in multiple ways. In one example, the terminal may determine whether a core network (also referred to as the network) has sent a UL grant in the target BWP when the terminal has UL data for transmission. The lack of the UL grant in the target BWP may indicate that BWP switching was not successful. In another example, the terminal may determine that a DL grant cannot be detected when the terminal has an ongoing DL service, which may be an indication that BWP switching to the target BWP was not successful. Upon determining a BWP mismatch, the terminal may identify a recovery window in which a connection to the original BWP may be recovered.

In other embodiments, to identify the mismatch, the terminal may trigger an operation in the target BWP. The operation may be an SR procedure or a RACH procedure on the target BWP. Upon detecting a BWP switch, the terminal may identify a detection window to determine whether switching was successful. In the BWP mismatch detection operation, the terminal may start a two-trigger operation to perform the SR procedure and the RACH procedure on the target BWP. Upon determining a BWP mismatch, the terminal may identify a recovery window in which the connection to the original BWP may be reestablished in multiple ways. In one example, the connection may be reestablished directly by the terminal based on a specific service configuration or activity. In another example, the connection may be reestablished by triggering a specific RACH procedure in the original BWP.

The following is a glossary of terms that may be used in this disclosure:

Memory Medium—Any of various types of non-transitory memory devices or storage devices. The term "memory medium" is intended to include an installation medium, (e.g., a CD-ROM, floppy disks, or tape device; a computer system memory or random access memory such as DRAM, DDR RAM, SRAM, EDO RAM, Rambus RAM), a non-volatile memory such as a Flash, magnetic media (e.g., a hard drive, or optical storage; registers, or other similar types of memory elements). The memory medium may include other types of non-transitory memory as well or combinations thereof. In addition, the memory medium may be located in a first computer system in which the programs are executed or may be located in a second different computer system which connects to the first computer system over a network, such as the Internet. In the latter instance, the second computer system may provide program instructions to the first computer for execution. The term "memory medium" may include two or more memory mediums which may reside in different locations (e.g., in different computer systems that are connected over a network). The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

User Equipment (UE) (also "User Device," "UE Device," or "Terminal")—any of various types of computer systems or devices that are mobile or portable and that perform wireless communications. Examples of UE devices include mobile telephones or smart phones (e.g., iPhone™, Android™-based phones), portable gaming devices (e.g., Nintendo Switch™, Nintendo DS™, PlayStation Vita™, PlayStation Portable™, Gam eb oy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, and the like. In general, the terms "UE" or "UE device" or "terminal" or "user device" may be broadly defined to encompass any electronic, computing, and/or telecommunications device (or combination of devices) that is easily transported by a user (or vehicle) and capable of wireless communication.

Wireless Device—any of various types of computer systems or devices that perform wireless communications. A wireless device may be portable (or mobile) or may be stationary or fixed at a certain location. A UE is an example of a wireless device.

Communication Device—any of various types of computer systems or devices that perform communications, where the communications may be wired or wireless. A communication device may be portable (or mobile) or may be stationary or fixed at a certain location. A wireless device is an example of a communication device. A UE is another example of a communication device.

Base Station—The terms "base station," "wireless base station," or "wireless station" have the full breadth of their ordinary meaning, and at least includes a wireless communication station installed at a fixed location and used to communicate as part of a wireless telephone system or radio system. For example, if the base station is implemented in the context of LTE, it may alternately be referred to as an eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," and the like, may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," and the like, are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an Application Specific Integrated Circuit (ASIC), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, and the like). For example, LTE may support scalable channel bandwidths from 1.4 MHz to 20 MHz. WLAN channels may be 22 MHz wide while Bluetooth channels may be 1 Mhz wide. Other protocols and standards may include different definitions of channels. Furthermore, some standards may define and use multiple types of channels (e.g., different channels for uplink or downlink and/or different channels for different uses such as data, control information, and the like).

Band—The term "band" has the full breadth of its ordinary meaning, and at least includes a section of spectrum (e.g., radio frequency spectrum) in which channels are used or set aside for the same purpose.

Configured to—Various components may be described as "configured to" perform a task or tasks. In such contexts, "configured to" is a broad recitation generally meaning "having structure that" performs the task or tasks during operation. As such, the component may be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component may be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is a non-limiting example of a possible system, and that features of this disclosure may be implemented in any of various systems, as desired.

As shown, the example wireless communication system includes a base station 102A, which communicates over a transmission medium with one or more user devices 106A and 106B, through 106Z. Each of the user devices may be referred to herein as a "user equipment" (UE). Thus, the user devices 106 are referred to as UEs or UE devices.

The base station (BS) 102A may be a base transceiver station (BTS) or cell site (e.g., a "cellular base station") and may include hardware that enables wireless communication with the UEs 106A through 106Z.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-A, 5G NR, HSPA, 3GPP2 CDMA2000. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some aspects, the UEs 106 may be IoT UEs, which may comprise a network access layer designed for low-power IoT applications utilizing short-lived UE connections. An IoT UE may utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using an SL interface for direct communications between devices. The IoT UEs may also execute background applications (e.g., keep-alive messages, status updates, and the like) to facilitate the connections of the IoT network.

As shown, the UEs 106, such as UE 106A and UE 106B, may directly exchange communication data via an SL inter- face 108. The SL interface 108 may be a PC5 interface comprising one or more physical channels, including but not limited to a Physical Sidelink Shared Channel (PSSCH), a Physical Sidelink Control Channel (PSCCH), a Physical Sidelink Broadcast Channel (PSBCH), and a Physical Side- link Feedback Channel (PSFCH). In one or more embodi- ments, two UE devices communicating with one another may exchange SL transmissions using the SL communica- tion link. The SL communication link may be defined for 5G NR in TS 38.331 of the 3GPP standard.

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU imple- mented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applica- tions/software to sense and control ongoing vehicular and pedestrian traffic. The RSU may operate on the 5.9 GHz Intelligent Transport Systems (ITS) band to provide very low latency communications required for high speed events, such as crash avoidance, traffic warnings, and the like. Additionally, or alternatively, the RSU may operate on the cellular V2X band to provide the aforementioned low latency communications, as well as other cellular commu- nications services. Additionally, or alternatively, the RSU may operate as a Wi-Fi hotspot (2.4 GHz band) and/or provide connectivity to one or more cellular networks to provide uplink and downlink communications. The comput- ing device(s) and some or all of the radio frequency circuitry of the RSU may be packaged in a weatherpr23 enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may pro- vide UEs 106 with various telecommunication capabilities, such as voice, SMS and/or data services.

Base station 102A and other similar base stations (such as base stations 102B through 102N) operating according to the same or a different cellular communication standard may thus be provided as a network of cells, which may provide continuous or nearly continuous overlapping service to UEs 106A-106Z and similar devices over a geographic area via one or more cellular communication standards.

Thus, while base station 102A may act as a "serving cell" for UEs 106A-106Z as illustrated in FIG. 1, each UE 106 may also be capable of receiving signals from (and possibly within communication range of) one or more other cells (which may be provided by base stations 102B-102Z and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A and 102B illustrated in FIG. 1 may be macro cells, while base station 102Z may be a micro cell. Other configurations are also possible.

In some aspects, base station 102A may be a next gen- eration base station, (e.g., a 5G New Radio (5G NR) base station, or "gNB"). In some aspects, a gNB may be con- nected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, and the like) in addition to at least one of the cellular communication protocol discussed in the definitions above. The UE 106 may also or alternatively be configured to communicate using one or more global navigational satellite systems (GNSS) (e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

In one or more embodiments, the UE 106 may be a device with cellular communication capability such as a mobile phone, a hand-held device, a computer, a laptop, a tablet, a smart watch, or other wearable device, or virtually any type of wireless device.

The UE 106 may include a processor (processing ele- ment) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/ or any of various other possible hardware components that are configured to perform (e.g., individually or in combina- tion) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/ eHRPD) or LTE using a single shared radio and/or GSM or LTE using the single shared radio. The shared radio may couple to a single antenna, or may couple to multiple antennas (e.g., for a multiple-input multiple output (MIMO) configuration) for performing wireless communications. In general, a radio may include any combination of a baseband processor, analog RF signal processing circuitry (e.g., including filters, mixers, oscillators, amplifiers, and the like), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some aspects, a downlink resource grid may be used for downlink transmissions from any of the base stations 102 to the UEs 106, while uplink transmissions may utilize similar techniques. The grid may be a time-frequency grid, called a resource grid or time-frequency resource grid, which is the physical resource in the downlink in each slot. Such a time-frequency plane representation is a common practice for Orthogonal Frequency Division Multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher layer signaling to the UEs 106. The physical downlink control channel (PDCCH) may carry information about the transport format and resource allocations related to the PDSCH channel, among other things. It may also inform the UEs 106 about the transport format, resource allocation, and HARQ (Hybrid Automatic Repeat Request) information related to the uplink shared channel. Typically, downlink scheduling (assigning control and shared channel resource blocks to the UE 106 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the Downlink Control Information (DCI) and the channel condition. There may be four or more different PDCCH formats defined in LTE with different numbers of CCEs (e.g., aggregation level, L=1, 2, 4, or 8).

Description of Communication Procedures in Specific BWPs

In one or more embodiments, communication procedures in specific BWPs are UL/DL signaling performed using (pre-)configured BWPs. In these communication procedures, each aforementioned physical channel corresponds to a set of resource elements carrying information originating from higher layers. These physical signals may include reference information signaling and synchronization information signaling. The reference information signaling may include configuration information identifying capabilities of at least one terminal a reference signal. The reference information may be a UE device-specific information that may be used to configure communication capabilities in the UE device (e.g., indicated via parameters such as UE-Capability as defined in TS 38.306 of the 3GPP standard). The synchronization information signaling may include synchronization information relating to allocation of resources for at least one synchronization signal exchanged in the specific BWP.

The reference signal is used to provide multiple UE devices with a baseline transmission information that these UE devices may identify on communication procedures exchanged with one other. As described above, reference signals are predefined signals occupying specific resource elements within a communication time-frequency grid. In the NR specification, multiple types of reference signals may be transmitted in different ways and intended to be used for different purposes by a receiving device.

Examples of synchronization information may include communication information relating to allocation of resources for at least one synchronization signal. One option for the synchronization signal may be a Demodulation Reference Signal (DMRS). Another option for the synchronization signal may be a Phase Tracking Reference Signal (PTRS) configured to track phase changes and compensate phase noise during communication procedures in specific BWPs with higher carrier frequencies. A time density and a frequency of the PTRS may be configured by the upper layers and may be configured per channel. Yet another option for the synchronization signal may be a Channel-State Information Reference Signal (CSI-RS). The CSI-RS may be used for channel sounding. The receiving device may measure the received CSI-RS, then may report back the CSI to the transmitter via the uplink. The CSI-RS may be configurable in both the time domain and frequency domain. The CSI-RS may be used to provide fine channel state information. An additional option for the synchronization signal may be a Synchronization Signal Block (SSB). The SSB may include Primary Synchronization Signal (PSS) and Secondary Synchronization Signal (SSS) symbols. The period of the SSB transmission may be 16 frames, and within each period, the number of SSB blocks N in the SSB period is configured at a Radio Resource Control (RRC)

level. The range of choices for N may vary based on the numerology and the frequency range configured for a given UE device.

In one or more embodiments, the UE devices are configured to handle simultaneous uplink/downlink transmissions. If any of the UE devices include limited reception capabilities in comparison to the rest of the UE devices, this terminal may prioritize communication reception or transmission in an existing BWP, or switching to a target BWP from an original BWP caused by higher layer signaling.

BWP transmissions may be organized into radio frames with a duration of $T_f$ each consisting of 20 slots of duration $T_{slot}$. A subframe consists of two consecutive slots, starting with an even-numbered slot. A transmitted physical channel or signaling in a slot may be described by a resource grid corresponding to a first number of subcarriers and a second number of Single-Carrier (SC)-Frequency Division Multiple Access (FDMA) symbols.

In some embodiments, BWP transmissions may be configured in accordance with a resource allocation pattern provided by the network. The resource allocation pattern may provide dynamic grants of resources, as well as grants of periodic resources configured semi-statically by UL/DL configured grants. To improve a reliability of the BWP transmissions, a dynamic grant DCI may provide resources for one or multiple transmissions of a transport block. These configured grants may be transmissions in a specific BWP configured to be immediately used by a UE device, until these grants are released by RRC signaling. The UE device may be allowed to continue using this type of configured grant when beam failure or physical layer problems occur in NR access links (Uu) until a Radio Link Failure (RLF) detection timer expires, before falling back to an exception resource pool. Another type of configured grant may be configured once and may not be used until a BS device sends the UE device a DCI indicating that the grant is now active, and until another DCI indicates deactivation.

In some embodiments, the BWP transmissions for the UE device may be configured in accordance with a self-selected resource allocation pattern predefined by a specific service. The BWP transmissions may be transmitted by the UE device a certain number of times after a resource allocation pattern is selected, or until a cause of resource reselection is triggered.

As described above, the configuration of BWPs may be established by the RRC layer and provided to lower layers when activated. There may be at least one active BWP for the UE device at a time in a given frequency band. The BWP may be defined by its frequency, bandwidth, SCS, and CP. The BWP may define parameters common to all the resources that are contained within it, namely a number of symbols and starting symbol used for all slots (except those with SSB), power control, location of a Direct Current (DC) subcarrier, etc.

The BWP may have different lists of resources for transmissions and receptions, to allow for the UE device to transmit in one set of resources and receive in another one. For BWP transmissions, there may be one set of resources for a selected mode, one for a scheduled mode (e.g., when the gNodeB helps with resource selection), and one for exceptional situations. These resources may be expected to be used for only transmission or reception, except when feedback mechanisms are activated, in which case the UE device may transmit Acknowledgement (ACK) messages and receive ACK messages using different resources.

In one or more embodiments, the resources may be divided into sub-channels of a predefined size, which may take one of multiple values (i.e., 10, 12, 15, 20, 25, 50, 75, and 100 sub-channels). Depending on the value, some RB s inside the resource pool may not be used by the UE device.

In the time domain, a resource allocation may have some available slots that are configured by various parameters. To determine which slots will be utilized for a particular type of signal transmission or reception, a series of criteria may be applied. The slots where SSB is transmitted may not be used. The number and locations of those slots may be based on a predefined configuration. Slots that are not allocated for UL (e.g., in the case of Time Division Multiplexing (TDD)) or do not have all the symbols available (as per a predetermined BWP configuration) may also be excluded from usage. Some slots may be reserved such that a number of remaining slots is a multiple of a predefined bitmap length, that can range from 10 bits to 160 bits. The reserved slots may be spread throughout a variable number of slots. The bitmap may be applied to the remaining slots to compute a final set of identified/labeled slots that may be utilized.

In some embodiments, the duration of each frame and subframe is 10 milliseconds (ms) and 1 ms, respectively. The frames and subframes may include a numerology μ which may define the SCS, a number of slots in a subframe, and cyclic prefix options. In 5G NR, the value of μ ranges from 0 to 3. In addition, the supported μ values vary at different frequency bands. In the frequency domain, the SCS may be defined by the numerology. In this regard, the SCS may be directly proportional to the numerology. Within the subframe, slots may be numbered from 0 to N subframe. In 5G NR, given that different UE devices may operate in a different BWP and using a different numerology, a common resource block may be used for a device to locate frequency resources within the carrier bandwidth.

In 5G NR technologies, information elements associated with BWPs are used to configure a BWP as defined in TS 38.211 of the 3GPP standard. For each serving cell, the network configures at least an initial BWP including a downlink BWPs and/or at least one uplink BWP (e.g., if the serving cell is configured with an uplink or if using supplementary uplink (SUL)). Further, the network may configure additional uplink and downlink BWPs for a serving cell. In some embodiments, the BWP is configurated is split into uplink and downlink parameters and into common and dedicated parameters. In TS 38.331 of the 3GPP standard, Common parameters (e.g., in information elements BWP-UplinkCommon and BWP-DownlinkCommon) are cell-specific and the network ensures the necessary alignment with corresponding parameters of other UE devices. The common parameters of the initial BWP of a primary cell (PCell) are also provided via system information. For all other serving cells, the network provides the common parameters via dedicated signaling.

The BWP parts may be further configured as described with respect to the BWP field descriptions defined in TS 38.331 of the 3GPP standard. In one or more embodiments, the information element cyclicPrefix indicates whether to use an extended CP for a given BWP. If this information element is not set, the UE device may use a normal CP. The normal CP is supported for all numerologies and slot formats. The extended CP is supported only for 60 kHz SCS. The information element locationAndBandwidth indicates a frequency domain location and bandwidth of a given BWP. The value of this field may be interpreted as a resource indicator value (RIV). A first PRB may be a PRB determined by the information element subcarrierSpacing of this BWP and offsetToCarrier (configured in the information element SCS-SpecificCarrier contained within the information element FrequencyInfoDLIFrequencyInfoUL) corresponding to this subcarrier spacing. In case of TDD, a BWP-pair (e.g., UL BWP and DL BWP with a same bwp-Id) may have a same center frequency. The information element subcarrierSpacing indicates SCS to be used in this BWP for all channels and reference signals unless explicitly configured elsewhere. Herein, a value "kHz15" corresponds to μ=0, kHz30 to μ=1, and so on. For an initial DL BWP, this field may have a same value as the field subCarrierSpacingCommon in a Master Information Block (MIB) of a same serving cell.

In some embodiments, an information element bwp-Id is an identifier for a given BWP as defined in TS 38.331 of the 3GPP standard. Other parts of the RRC configuration may use the BWP-Id to associate themselves with a particular BWP. The BWP-ID=0 may be associated with the initial BWP and may hence not be used in other BWPs. In this case, the network may trigger the UE device to switch UL BWP or DL BWP using a DCI field. If the four code points in that DCI field are mapped to the RRC-configured BWP-ID, up to 3 configured BWPs (in addition to the initial BWP) may be configured using a DCI code point equivalent to the BWP-ID (e.g., initial=0, first dedicated=1, and so on). If the network configures 4 dedicated BWPs, these BWPs are identified by DCI code points 0 to 3.

In one or more embodiments, the bandwidth of each BWP is equal or greater than a SS Block bandwidth, but it may not contain SS Block. Only one carrier BWP may be active at a given time. In this case, the UE device may not expect to receive PDSCH, PDCCH, CSI-RS, or TRS outside an active BWP. Each DL BWP may include at least one Control Resource Set (CORESET) with a UE Specific Search Space (USS). Control Resource Set (CORESET) is where the UE device searches for downlink control signals. CORESETs are configured at cell level so that the configuration can be reused for any applicable BWP. The CORESET is a set of physical resources (i.e., a specific area on NR Downlink Resource Grid) and a set of parameters that is used to carry the PDCCH/DCI. In a primary carrier, at least one of the configured DL BWPs may include one CORESET with common search space (CSS). The search space is an area within a CORESET that the UE device monitors to detect a specific PDCCH/DCI. The USS and the CSS used by the UE device may be defined by a Radio Network Temporary Identifier (RNTI) type or RRC configuration in the manner described in reference to TS 38.213 in the 3GPP standard.
BWP Switching BWP switching includes deactivating a currently active BWP and activating another configured BWP. In TDD, DL and UL BWPs may differ only by the transmission bandwidth and numerology (e.g., switched together). There may be also a default BWP configured for DL and UL. If not configured, an initial BWP is used as default. The default BWP is used to send/receive transmissions to/from the UE device.

BWP switching may be performed using a dedicated RRC signaling; over a PDCCH/DCI UL Grant and/or DL Scheduling; based on a bwp-inactivityTimer and/or based on the MAC CE (Control Element). In this mechanism, to help to recover from DCI lost scenarios, the activation/deactivation of DL BWP (or DL/UL BWP pair for the case of unpaired spectrum) by means of the timer bwp-inactivityTimer. With this mechanism, if the UE device is not scheduled for a certain amount of time (e.g., expiration of timer) the UE device switches its active DL BWP (or DL/UL BWP pair) to a default one.

In some embodiments, there is an initial active BWP for a UE device during an initial access until the UE device is explicitly configured with BWPs during or after RRC connection establishment. The initial active BWP may be the default BWP, unless configured otherwise.
Procedure to Access a Specific BWP The UE device may start an access to the network by acquiring an SSB that consists of PSS, SSS, and PBCH. This spans 4 OFDM symbols and 20 RBs. It contains the MIB. The MIB contains a CORESET #0 configuration. This is used by the UE device to infer the initial DL BWP. The UE device receives and decodes the CORESET #0, which contains a System Information Block 1 (SIB1). The SIB1 sets the initial BWP for both DL and UL. The initial BWP is named BWP #0. The DL BWP #0 is configured such that it includes CORESET #0. In some embodiments, a RACH access happens with UL BWP #0. The network responds with DL BWP #0 until an RRC connection happens. Once the RRC connection happens, the UE device may be configured with UE device-specific BWPs.

In some embodiments, when the UE device moves from an idle mode to an RRC connected mode, RRC signaling may configure UE-specific BWPs. RRC configuration or reconfiguration message may specify one of these BWPs to be activated. If so, the UE device may initiate BWP switching. Due to RRC processing delays, BWP switching may be performed in on the order of tens of milliseconds.

Once the UE device is configured with multiple BWPs, the network may command the UE device to switch from an original BWP to a target BWP using the DCI in the PDCCH. In some embodiments, a DCI format 1_1 may be used for downlink assignment and a DCI format 0_1 may be used for uplink grants. These formats may contain a BWP indicator (e.g., BWP ID) that can take 1 or 2 bits. If more than 2 BWPs are configured, 2-bit indicator is used. In the DCI, as described above, BWP ID indicates a target BWP. The UE device may trigger BWP switching to the target BWP only if the target BWP ID is not the same as a current BWP ID (e.g., indicating the original BWP). DCI format 0_1 is used for uplink resource allocation (i.e., scheduling grants) for PUSCH. Further, DCI format 1_1 is used for allocating downlink resources for PDSCH.

In one or more embodiments, BWP switching may be triggered when a BWP inactivity timer expires. In this case, a switch to default BWP may be triggered. The BWP inactivity timer ranges from 2-2560 ms.
Scheduling Request (SR)

An SR is a Layer 1 (Physical Layer) signal or message sent by the UE device to the BS device to ask for an UL grant to send UL data as described in TS 38.213 of the 3GPP standard. The UL grant is sent to the UE device by the BS device over downlink signaling in DCI Format 0_0 or DCI Format 0_1. The SR mechanism is controlled by the MAC Layer. The BS device may configure the UE device with a Max SR to get the UL grant. The SR may be used to declare a Radio Link Failure if a parameter SR-COUNTER reaches a value of sr-TranMax.

In some embodiments, the information element sr-TransMax is an SR Max Transmissions Condition indicating that when the maximum number of SR requests are sent and the UL grant cannot be obtained, a random access process is triggered to obtain the uplink scheduling.
Random Access Channel (RACH)

The RACH is used to achieve UL synchronization between the UE device and the BS device; obtain a RRC Connection Request. The RACH may establish a timing synchronization between a receiver and a transmitter. In 5G NR, the RACH may be used to create an initial connection with the network. In the RACH, the UE device selects a code sequence as a preamble and sends it at a random time on a UL channel called Physical Random Access Channel (PRACH). The UE device may start monitoring a DL channel to see if the BS device answers the request to connect to the network. If not, the UE device may make a new attempt with increased power. Once a random access (RA) procedure is completed using the RACH, the UE device moves to a connected state and a UE device-network communication may continue using a normal dedicated transmission.

In 5G NR, the RACH uses a contention based random access (CBRA) procedure or a contention free random access (CFRA) procedure. The CFRA is a mode that the UE device initially uses to perform the RA procedure in a non-standalone mode. The UE device uses an assigned preamble to perform RA and the procedure finishes once the UE device receives a random access response (RAR) from the BS device. Further, the CBRA is a fallback scenario in the non-standalone mode. If the CFRA fails (e.g., if the transmission of the dedicated preamble is not acknowledged by the BS station, within a configured time period) then the UE device may switch to the CBRA to establish UL synchronization. The CFRA is typically applied when the UE device is in a CONNECTED mode.

In one or more embodiments, the UE device preforms a signal quality measurements on surrounding NR cells and decides the best received SSB (e.g., beam) index. The identified index determines on which frequency-time resource the RA preamble is transmitted using the PRACH. This procedure may enable the BS device to focus subsequent DL transmissions of RAR in a same direction. For the CFRA, the procedure ends with the reception of RAR. For the CBRA, the UE device uses the information provided by the RAR to begin initial transmission on the PUSCH using the same beam direction as for preamble transmission.

Example UE Device

Figure 2:
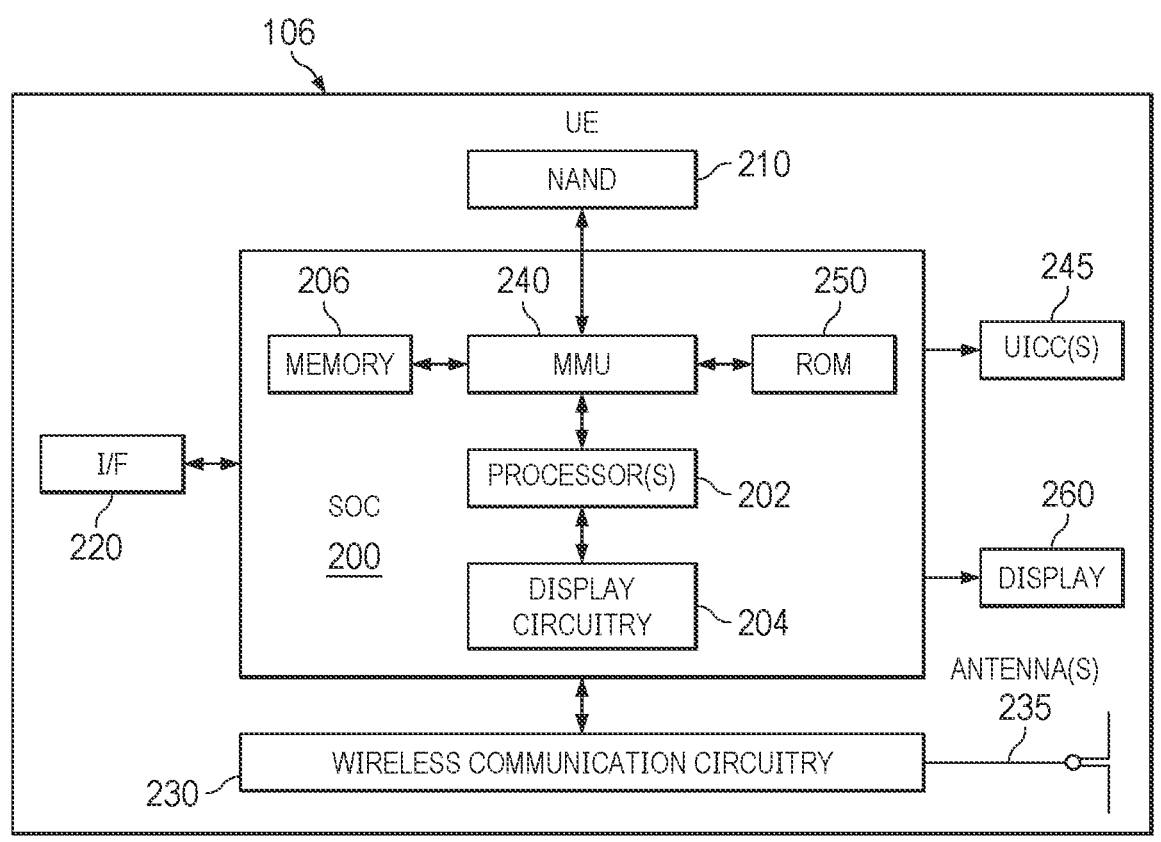
FIG. 2 illustrates an example block diagram of a UE, according to some aspects.

FIG. 2 illustrates an example simplified block diagram of a communication device 106, according to some aspects. It is noted that the block diagram of the communication device of FIG. 2 is only one example of a possible communication device. According to aspects, communication device 106 may be a UE device or terminal, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 200 configured to perform core functions. For example, this set of components may be implemented as a system on chip (SOC), which may include portions for various purposes. Alternatively, this set of components 200 may be implemented as separate components or groups of components for the various purposes. The set of components 200 may be coupled (e.g., communicatively; directly or indirectly) to various other circuits of the communication device 106.

For example, the communication device 106 may include various types of memory (e.g., including NAND flash 210), an input/output interface such as connector I/F 220 (e.g., for connecting to a computer system; dock; charging station; input devices, such as a microphone, camera, keyboard; output devices, such as speakers; and the like), the display 260, which may be integrated with or external to the communication device 106, and wireless communication circuitry 230 (e.g., for LTE, LTE-A, NR, UMTS, GSM, CDMA2000, Bluetooth, Wi-Fi, NFC, GPS, and the like). In some aspects, communication device 106 may include wired communication circuitry (not shown), such as a network interface card (e.g., for Ethernet connection).

The wireless communication circuitry 230 may couple (e.g., communicatively; directly or indirectly) to one or more antennas, such as antenna(s) 235 as shown. The wireless communication circuitry 230 may include cellular communication circuitry and/or short to medium range wireless communication circuitry, and may include multiple receive chains and/or multiple transmit chains for receiving and/or transmitting multiple spatial streams, such as in a MIMO configuration.

In some aspects, as further described below, cellular communication circuitry 230 may include one or more receive chains (including and/or coupled to (e.g., communicatively; directly or indirectly) dedicated processors and/or radios) for multiple Radio Access Technologies (RATs) (e.g., a first receive chain for LTE and a second receive chain for 5G NR). In addition, in some aspects, cellular communication circuitry 230 may include a single transmit chain that may be switched between radios dedicated to specific RATs. For example, a first radio may be dedicated to a first RAT (e.g., LTE) and may be in communication with a dedicated receive chain and a transmit chain shared with a second radio. The second radio may be dedicated to a second RAT (e.g., 5G NR) and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements.

The communication device 106 may further include one or more smart cards 245 that include Subscriber Identity Module (SIM) functionality, such as one or more Universal Integrated Circuit Card(s) (UICC(s)) cards 245.

As shown, the SOC 200 may include processor(s) 202, which may execute program instructions for the communication device 106 and display circuitry 204, which may perform graphics processing and provide display signals to the display 260. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, wireless communication circuitry 230, connector I/F 220, and/or display 260. The MMU 240 may be configured to perform memory protection and page table translation or set up. In some aspects, the MMU 240 may be included as a portion of the processor(s) 202.

As noted above, the communication device 106 may be configured to communicate using wireless and/or wired communication circuitry. As described herein, the communication device 106 may include hardware and software components for implementing any of the various features and techniques described herein. The processor 202 of the communication device 106 may be configured to implement part or all of the features described herein, such as implementing the logic to allow the communication device 106 to recover from BWP out-of-sync scenarios (e.g., by executing program instructions stored on a memory medium). Alternatively (or in addition), processor 202 may be configured as a programmable hardware element, such as a Field Programmable Gate Array (FPGA), or as an Application Specific Integrated Circuit (ASIC). Alternatively (or in addition) the processor 202 of the communication device 106, in conjunction with one or more of the other components 200, 204, 206, 210, 220, 230, 240, 245, 250, 260 may be configured to implement part or all of the features described herein.

In addition, as described herein, processor 202 may include one or more processing elements. Thus, processor 202 may include one or more integrated circuits (ICs) that are configured to perform the functions of processor 202. In addition, each integrated circuit may include circuitry (e.g., first circuitry, second circuitry, and the like) configured to perform the functions of processor(s) 202.

Further, as described herein, wireless communication circuitry 230 may include one or more processing elements. In other words, one or more processing elements may be included in wireless communication circuitry 230. Thus, wireless communication circuitry 230 may include one or more integrated circuits (ICs) that are configured to perform the functions of wireless communication circuitry 230. In addition, each integrated circuit may include circuitry (e.g., first circuitry, second circuitry, and the like) configured to perform the functions of wireless communication circuitry 230.

Example Base Station

Figure 3:
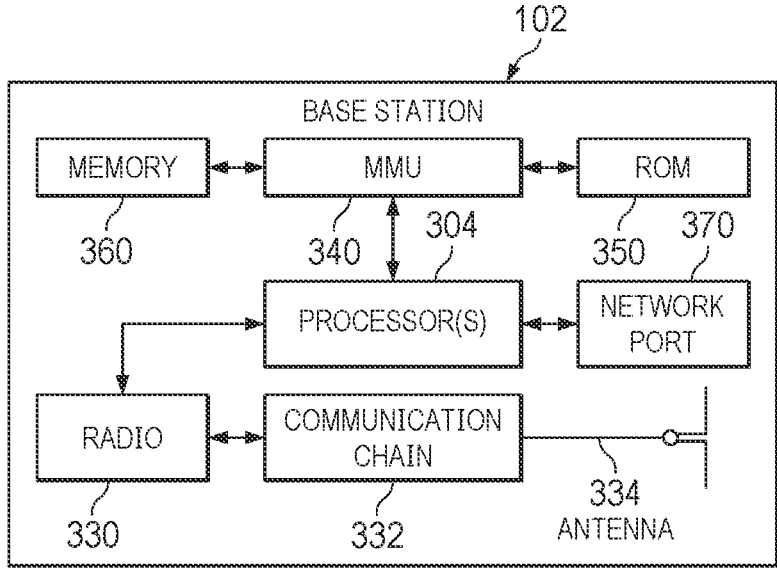
FIG. 3 illustrates an example block diagram of a BS, according to some aspects.

FIG. 3 illustrates an example block diagram of a base station 102, according to some aspects. It is noted that the base station of FIG. 3 is a non-limiting example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIG. 1.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

In some aspects, base station 102 may be a next generation base station, (e.g., a 5G New Radio (5G NR) base station, or "gNB"). In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 334, and possibly multiple antennas. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless communication standards, including 5G NR, LTE, LTE-A, GSM, UMTS, CDMA2000, Wi-Fi, and the like.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, and the like).

Further, the BS 102 may include hardware and software components for implementing or supporting implementation of features described herein. The processor 304 of the base station 102 may be configured to implement or support implementation of part or all of the methods described herein (e.g., by executing program instructions stored on a memory medium). Alternatively, the processor 304 may be configured as a programmable hardware element, such as a Field Programmable Gate Array (FPGA), or as an Application Specific Integrated Circuit (ASIC), or a combination thereof. Alternatively (or in addition) the processor 304 of the BS 102, in conjunction with one or more of the other components 330, 332, 334, 340, 350, 360, 370 may be configured to implement or support implementation of part or all of the features described herein.

In addition, as described herein, processor(s) 304 may include one or more processing elements. Thus, processor(s) 304 may include one or more integrated circuits (ICs) that are configured to perform the functions of processor(s) 304. In addition, each integrated circuit may include circuitry (e.g., first circuitry, second circuitry, and the like) configured to perform the functions of processor(s) 304.

Further, as described herein, radio 330 may include one or more processing elements. Thus, radio 330 may include one or more integrated circuits (ICs) that are configured to perform the functions of radio 330. In addition, each integrated circuit may include circuitry (e.g., first circuitry, second circuitry, and the like) configured to perform the functions of radio 330.

Example Cellular Communication Circuitry

Figure 4:
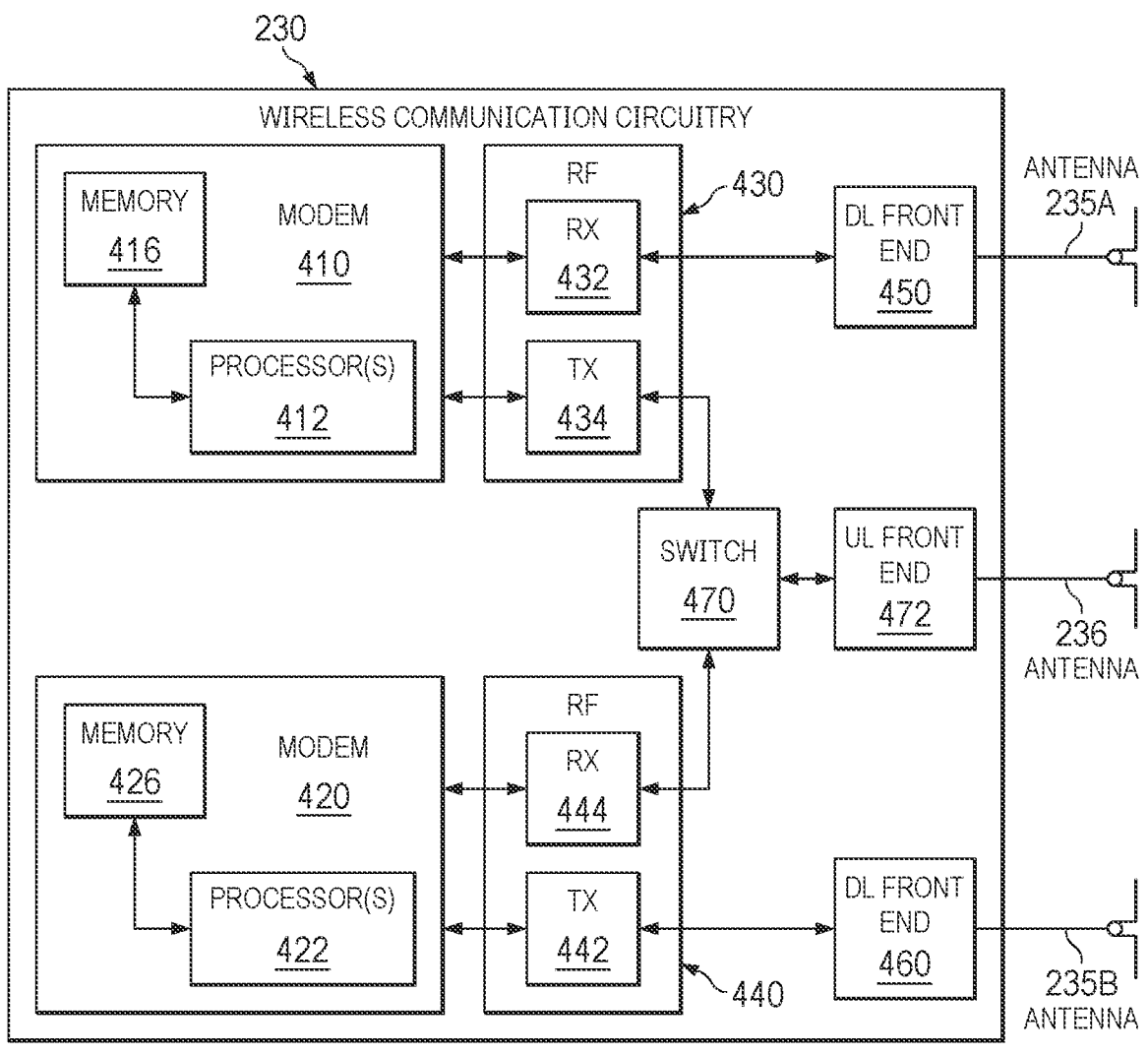
FIG. 4 illustrates an example block diagram of wireless communication circuitry, according to some aspects.

FIG. 4 illustrates an example simplified block diagram of cellular communication circuitry, according to some aspects.

It is noted that the block diagram of the cellular communication circuitry of FIG. 4 is only one example of a possible cellular communication circuit; other circuits, such as circuits including or coupled to sufficient antennas for different RATs to perform uplink activities using separate antennas, or circuits including or coupled to fewer antennas (e.g., that may be shared among multiple RATs) are also possible. According to some aspects, cellular communication circuitry 230 may be included in a communication device, such as communication device 106 described above. As noted above, communication device 106 may be a UE device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 230 may couple (e.g., communicatively; directly or indirectly) to one or more antennas, such as antennas 235a, 235b, and 236 as shown. In some aspects, cellular communication circuitry 230 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 4, cellular communication circuitry 230 may include a first modem 410 and a second modem 420. The first modem 410 may be configured for communications according to a first RAT, e.g., such as LTE or LTE-A, and the second modem 420 may be configured for communications according to a second RAT, e.g., such as 5G NR.

As shown, the first modem 410 may include one or more processors 412 and a memory 416 in communication with processors 412. Modem 410 may be in communication with a radio frequency (RF) front end 430. RF front end 430 may include circuitry for transmitting and receiving radio signals. For example, RF front end 430 may include receive circuitry (RX) 432 and transmit circuitry (TX) 434. In some aspects, receive circuitry 432 may be in communication with downlink (DL) front end 450, which may include circuitry for receiving radio signals via antenna 235a.

Similarly, the second modem 420 may include one or more processors 422 and a memory 426 in communication with processors 422. Modem 420 may be in communication with an RF front end 440. RF front end 440 may include circuitry for transmitting and receiving radio signals. For example, RF front end 440 may include receive circuitry 442 and transmit circuitry 444. In some aspects, receive circuitry 442 may be in communication with DL front end 460, which may include circuitry for receiving radio signals via antenna 235b.

In some aspects, a switch 470 may couple transmit circuitry 434 to uplink (UL) front end 472. In addition, switch 470 may couple transmit circuitry 444 to UL front end 472. UL front end 472 may include circuitry for transmitting radio signals via antenna 236. Thus, when cellular communication circuitry 230 receives instructions to transmit according to the first RAT (e.g., as supported via the first modem 410), switch 470 may be switched to a first state that allows the first modem 410 to transmit signals according to the first RAT (e.g., via a transmit chain that includes transmit circuitry 434 and UL front end 472). Similarly, when cellular communication circuitry 230 receives instructions to transmit according to the second RAT (e.g., as supported via the second modem 420), switch 470 may be switched to a second state that allows the second modem 420 to transmit signals according to the second RAT (e.g., via a transmit chain that includes transmit circuitry 444 and UL front end 472).

As described herein, the first modem 410 and/or the second modem 420 may include hardware and software components for implementing any of the various features and techniques described herein. The processors 412, 422 may be configured to implement part or all of the features described herein, e.g., by executing program instructions stored on a memory medium, such as implementing the logic to allow the cellular communication circuitry 230 to help UEs recover from BWP out-of-sync scenarios (e.g., a non-transitory computer-readable memory medium). Alternatively (or in addition), processors 412, 422 may be configured as a programmable hardware element, such as an FPGA (Field Programmable Gate Array), or as an ASIC (Application Specific Integrated Circuit). Alternatively (or in addition) the processors 412, 422, in conjunction with one or more of the other components 430, 432, 434, 440, 442, 444, 450, 470, 472, 235 and 236 may be configured to implement part or all of the features described herein.

In addition, as described herein, processors 412, 422 may include one or more processing elements. Thus, processors 412, 422 may include one or more integrated circuits (ICs) that are configured to perform the functions of processors 412, 422. In addition, each integrated circuit may include circuitry (e.g., first circuitry, second circuitry, and the like) configured to perform the functions of processors 412, 422.

In some aspects, the cellular communication circuitry 230 may include only one transmit/receive chain. For example, the cellular communication circuitry 230 may not include the modem 420, the RF front end 440, the DL front end 460, and/or the antenna 235b. As another example, the cellular communication circuitry 230 may not include the modem 410, the RF front end 430, the DL front end 450, and/or the antenna 235a. In some aspects, the cellular communication circuitry 230 may also not include the switch 470, and the RF front end 430 or the RF front end 440 may be in communication, e.g., directly, with the UL front end 472.

Example of a BWP Switching Operation

Figure 5:
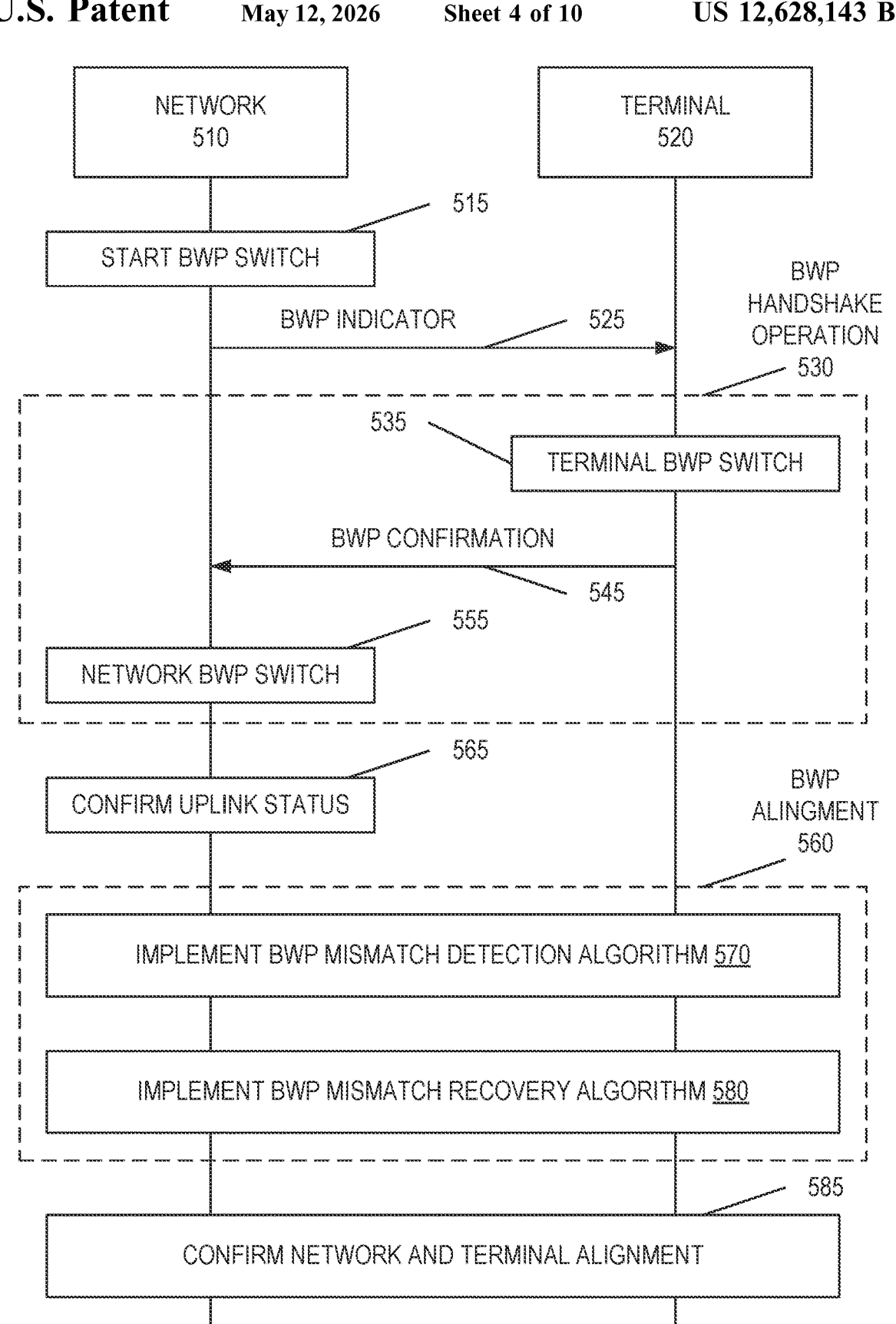
FIG. 5 is a diagram illustrating an example of a Bandwidth Part (BWP) switching operation, according to some aspects.

FIG. 5 illustrates an example of a BWP switching operation in which a BWP mismatch is detected and recovered, in accordance with one or more embodiments. The BWP switching operation is performed by a terminal 520. The terminal 520 may be any wireless communication device capable of configuring transmission/reception for a specific BWP (e.g., a UE device). In the example of FIG. 5, a network 510 (e.g., a BS device) instructs the terminal 520 to transition from an original BWP to a target BWP. The network 510 and the terminal 520 may be exchanging transmission/reception signaling on the original BWP before the BWP switching is started. The original BWP may be an initial BWP configured during an initialization of the terminal 520 in the manner described above. In the example of FIG. 5, the BWP switching fails and a BWP mismatch detection and recovery is implemented in response.

In one or more embodiments, the BWP mismatch occurs when the BWP configured for the network 510 and the BWP configured for the terminal 520 are different. The BWP mismatch may occur when the terminal 520 detects a DCI indicating a BWP switch from the original BWP to the target BWP, while the network 510 does not schedule any DL/UL signaling on the target BWP. The terminal 520 may be considered to be out-of-sync when the BWP mismatch occurs. Further, the network 510 and the terminal 520 may be out-of-sync in one or more aspects of their signaling information. For example, the network 510 and the terminal 520 may be out-of-sync in a power domain, a timing domain, and/or a frequency domain.

In the example of FIG. 5, at 515, the network 510 starts a BWP switch based on DL signaling received (e.g., via higher-layer signaling). The BWP switch may be aimed at providing the terminal 520 with specific transmission/reception parameters to handle upcoming communication with the network 510. After the network 510 determines a start of the BWP switch, the network 515 provides a BWP indicator 525 in a transmission including DL signaling. The BWP indicator 525 may include the DCI that informs the terminal 520 of a new BWP ID. The change in the BWP ID causes the terminal 520 to attempt BWP switching.

At 530, a handshake operation 530 is triggered by the DCI. During the handshake operation 530, the network 510 and the terminal 520 are meant to transition from the original BWP to the target BWP. At 535, the terminal 520 attempts a switch by allocating resources in accordance with the BWP ID provided by the network 510 in the BWP indicator 525. The terminal 520 provides a BWP confirmation 545 once the terminal 520 switches to the target BWP. In the BWP confirmation 545, the terminal 520 acknowledges to the network 510 that the BWP has been switched. At 555, the network 510 transitions to the target BWP by allocating resources from the original BWP to continue communication with the terminal 520.

In one or more embodiments, the network 510 provides one of different DCI formats to the terminal 520. Under DCI format 0_1, the terminal 520 is instructed to send a PUSCH on the target BWP to acknowledge the switch to the target BWP. Under DCI format 1_1, the network 510 attempts a follow-up confirmation that the BWP switching was successful.

At 565, after the BWP handshake operation is completed, the network 510 confirms an uplink status where the terminal 520 transmits/receives DL/UL signaling using the target BWP. At this stage, the network 510 determines whether the BWP switching was successful based on the uplink status.

In the example of FIG. 5, if the uplink status cannot be immediately confirmed, a BWP alignment 560 is attempted in accordance with one or more embodiments. At this stage, the terminal 520 implements a BWP mismatch detection algorithm (BMDA) 570 and a BWP mismatch recovery algorithm (BMRA) 580. In the BMDA 570, the terminal 520 confirms whether there is a mismatch in the current BWP of the network 510 and the current BWP of the terminal 520. At this point, a BWP mismatch may be identified based on the format of the DCI. Under DCI format 0_1, the BWP mismatch is identified when the network 510 fails to detect the PUSCH from the terminal 520. Under DCI format 1_1, the BWP mismatch is identified when the network 510 misses the PUCCH/PUSCH acknowledgement for the PDSCH or PUSCH CRC failure. Further, the terminal 520 may hit a mis-detection or false alarm for a PDCCH decoding. In the BMRA 580, the terminal 520 attempts to recover the BWP connection back to the original BWP. At 585, after the BWP alignment 560, the network 510 and the terminal 520 may confirm network and terminal alignment back in the original BWP based on the confirmation of DL/UL signaling.

If the BWP mismatch is not identified, then the network 510 and the terminal 520 are considered to be aligned (e.g., both communicating on the target BWP).

Figure 6A:
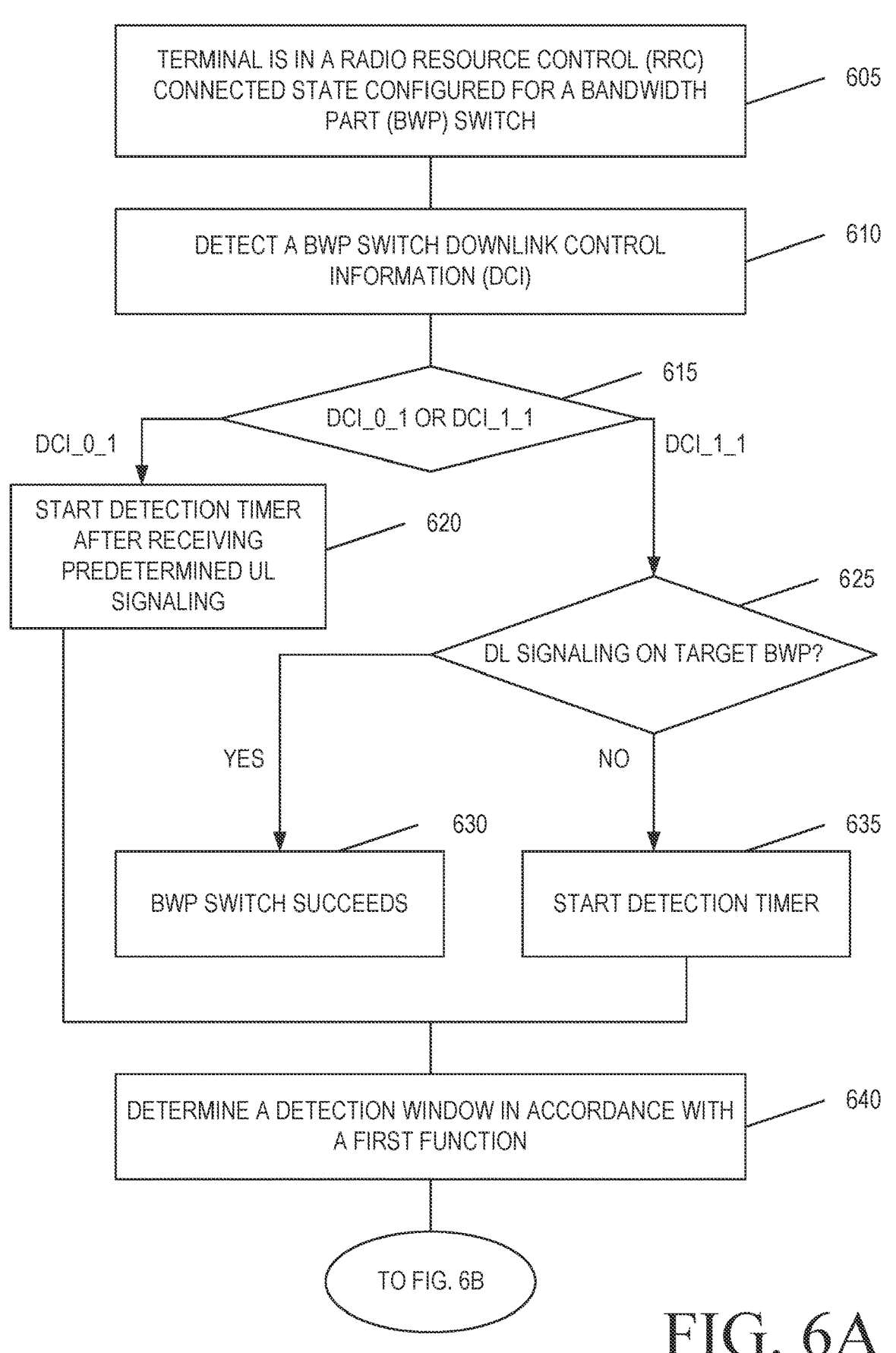
FIGS. 6A and 6B are flowcharts detailing methods of switching between two BWPs, according to some aspects.
Figure 6B:
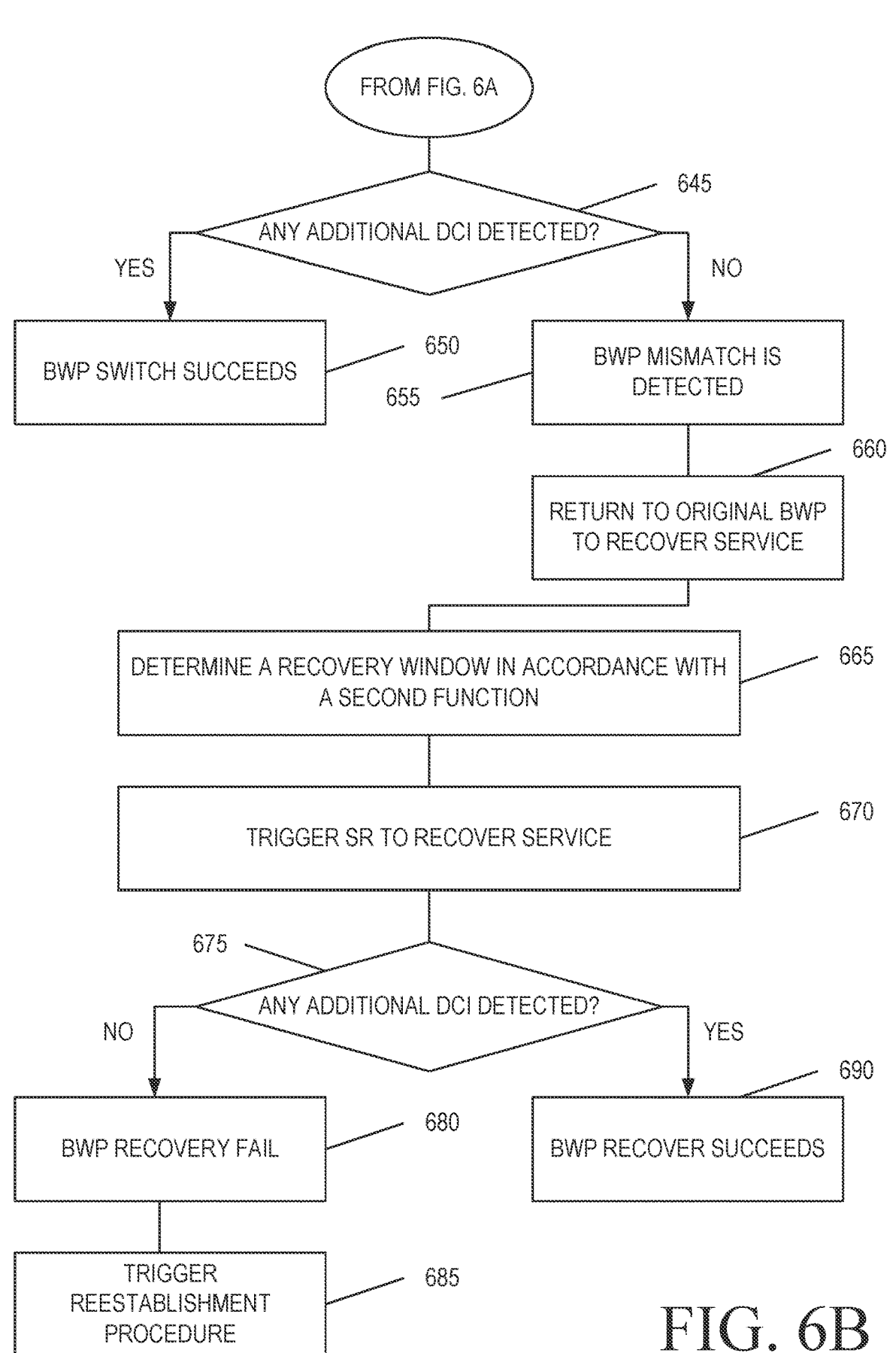

Turning to FIGS. 6A and 6B, a flowchart is shown detailing a method of detecting and recovering an out-ofsync BWP in accordance with one or more embodiments. In this example, the method is executed by the terminal 520 exchanging information via BWP communication links established with the network 510 in the manner described in reference to FIG. 5. In some embodiments, the terminal 520 uses timer-based algorithms for detection and recovery of BWPs in the terminal side. In this scenario, when a BWP switch is detected, the terminal 520 starts a BWP mismatch detection algorithm (BMDA) in a detection window. A BWP mismatch may be found when the terminal 520 has UL data while the network 510 does not send a UL Grant or when the terminal 520 has not detected any DL grants when the DL service is ongoing. Once a BWP mismatch is identified, the terminal 520 starts a BWP mismatch recovery algorithm (BMRA) in a recovery window. The terminal 520 implements the BMRA to return to the original BWP.

In FIGS. 6A and 6B, the flowchart shows a process for determining whether a mismatch has occurred when attempting a BWP switch and a process for recovering an original BWP connection. In one or more embodiments, the terminal 520 may be configured to obtain multiple downlink signals; identify, from the downlink signals, at least one configuration parameter including a BWP switching indicator (e.g., BWP ID); select resources from a target BWP indicated by the at least one configuration parameter; and determine a BWP mismatch based on whether the downlink signals include signaling using the target BWP.

In the example of FIG. 6A, at 605, the flowchart begins with a terminal 520 that is in a Radio Resource Control (RRC) connected stat and configured for a BWP switch. In connected state, radio resources are allocated to the terminal 520 and typically active communication (user plane or control plane) is taking place between the terminal 520 and the network 510. Otherwise, the terminal 520 is in idle state.

At 610, the flowchart continues where the terminal 520 detects a BWP switching indication via DCI in DL signaling from the network. As described above, in one or more embodiments, BWP switching may be performed using a dedicated RRC signaling; over a PDCCH/DCI UL Grant and/or DL Scheduling; based on a bwp-inactivityTimer and/or based on the MAC CE.

At 615, the flowchart continues where the terminal 520 determines a DCI format based on the DCI. In some embodiments, the terminal 520 may be configured to determine, from the downlink signals, a type of a DCI. The DCI format 0_1 may be used for uplink grants and the DCI format 1_1 may be used for downlink assignment. These formats may contain a BWP indicator (e.g., BWP ID) that causes the terminal 520 to switch between BWPs. In the DCI, as described above, BWP ID indicates a target BWP. The terminal 520 may trigger BWP switching to the target BWP only if the target BWP ID is not the same as a current BWP ID (e.g., indicating the original BWP). Based on the determined DCI format, the flowchart continues to 620 or 625.

At 620, if the DCI format is determined to be DCI format 0_1, the terminal 520 determines a BWP mismatch detection operation corresponding to this format. At this stage, because the DCI format 0_1 is used for uplink resource allocation (i.e., scheduling grants) for PUSCH, the terminal 520 starts a T_detection timer after a corresponding PUSCH is delivered to the network 510. The terminal 520 uses the timer to wait on a specific response from the network 510. In this case, the terminal 520 waits for an acknowledgement of the PUSCH to be received.

At 625, if the DCI format is determined to be DCI format 1_1, the terminal 520 determines a BWP mismatch detection operation corresponding to this format. At this stage, because the DCI format 1_1 is used for allocating downlink resources for PDSCH, the terminal 520 determines whether DL signaling is received on the target BWP. Specifically, the terminal 520 determines whether a corresponding PDSCH is detected on the target BWP.

At 630, if DL signaling is identified on the target BWP, the terminal 520 confirms that the BWP switching succeeded. The terminal 520 confirms that the DL signaling is received in reception signaling using the target BWP. As a result, a BWP mismatch has not occurred.

At 635, if no DL signaling is identified on the target BWP, the terminal 520 starts the T_detection timer. The terminal 520 uses the timer to wait on a specific response from the network 510. In this case, the terminal 520 waits for the corresponding PDSCH to be received.

At 640, the flowchart continues where the terminal 520 determines a detection window in accordance with a first function. The first function may be the BWP mismatch detection algorithm (BMDA) described in reference to FIG. 5. The terminal 520 determines a detection window in accordance with a first function. The detection window is determined as a function of time t using the BMDA. The detection window may be defined as a function F(t) =n*T_detection, where T_detection is the time for the detection window in milliseconds (ms) and the value n is a scale factor based for the T_detection timer based on a given service type.

The flowchart continues in FIG. 6B. At 645, the terminal 520 determines whether any following DCI is detected before the function F(t)=n*T_detection expires. The terminal 520 waits for a DCI to be received using the target BWP. The function F(t) is a dynamic algorithm to evaluate the BWP mismatch in ms (e.g., T_detection=1 ms).

At 650, if any additional DCI is detected, the terminal 520 confirms that the BWP switching succeeded. Specifically, the terminal 520 confirms that the DL signaling is received in reception signaling using the target BWP. As a result, the terminal 520 may determine that a BWP mismatch has not occurred.

At 655, if no additional DCI is detected, the terminal 520 determines that a BWP mismatch has occurred. The terminal 520 determines that a reliable connection never occurred with the target BWP. In the event of a BWP mismatch, the terminal 520 may be configured to return to the original BWP (that is different from the target BWP).

At 660, the flowchart continues where the terminal 520 proceeds to establish a communication procedure to return to the original BWP. The terminal 520 may attempt to transition to the original BWP from the target BWP.

At 665, the flowchart continues where the terminal 520 determines a recovery window in accordance with a second function. The recovery window is determined as a function of time t using the BWP mismatch recovery algorithm (BMRA) described in reference to FIG. 5. The recovery window may be defined as a function X(t)=m*T_recovery, where T_recovery is the time for the recovery window in milliseconds (ms) and the value m is a scale factor based for the T_recovery timer based on a given service type. In the event of a BWP recovery, the terminal 520 may determine whether the downlink signals include the DCI before the recovery window expires.

At 670, the flowchart continues where the terminal 520 triggers a Scheduling Request (SR) to recover service in the original BWP. The terminal 520 uses the SR to determine DL signaling in upcoming communications in the original BWP.

At 675, the flowchart continues to determine whether any additional DCI is detected. The terminal 520 may determine whether any following DCI is detected before the function X(t)=m*T_recovery expires. The terminal 520 waits for a DCI to be received using the original BWP. The function X(t) is a dynamic algorithm to evaluate the BWP recovery in ms (e.g., T_recovery=1 ms).

If no additional DCI is detected, the flowchart continues at 680, where the terminal 520 is configured to identify that the recovery operation is a recovery failure. At this stage, the terminal 520 estimates that the original BWP has not been reached for reconnection.

The flowchart ends at 685, where the terminal 520 triggers a reestablishment procedure. The reestablishment procedure attempts to connect the terminal 520 with the original BWP. The reestablishment procedure may be implemented as described in TS 38.331 of the 3GPP standard.

If any additional DCI is detected, the flowchart ends at 690, where the terminal 520 confirms that the BWP recovery succeeded. Specifically, the terminal 520 confirms that the DL signaling is received in reception signaling using the original BWP. As a result, the terminal 520 may determine that a BWP recovery has been completed.

In FIGS. 6A and 6B, the BMRA may be implemented by a terminal switching between the target BWP and the original BWP. In some embodiments, the BMRA may be supported in other two BWPs that do not include the target BWP and the original BWP when a network configures four BWPs.

Turning to FIG. 7A-7D, a flowchart is shown detailing a method of detecting and recovering out-of-sync BWPs in accordance with one or more embodiments. In this example, the method is executed by the terminal 520 exchanging information via BWP communication links established with the network 510 in the manner described in reference to FIG. 5. In some embodiments, the terminal 520 detects an out-of-sync BWP via an SR/RACH procedure based on one or more corresponding SR/RACH resources in a specific BWP. The network 510 configures specific resources including the information element SR-Resource and the rach-ConfigCommon before a BWP mismatch can be detected. In this scenario, when a BWP switch is detected, the terminal 520 starts a BWP mismatch detection algorithm (BMDA) in a detection window. The BMDA may include triggering SR/RACH on the target BWP to detect the BWP mismatch. There may be two triggers used the SR and the RACH on the target BWP. Once a BWP mismatch is identified, the terminal 520 starts a BWP mismatch recovery algorithm (BMRA) in a recovery window. The BMRA may include triggering a specific RACH on the original BWP or triggering a reestablishment procedure directly based on an indication of a specific service.

In FIGS. 7A-7D, the flowchart shows a process for determining whether a mismatch has occurred when attempting a BWP switch and a process for recovering an original BWP connection. In one or more embodiments, the terminal 520 may be configured to obtain multiple downlink signals; identify, from the downlink signals, at least one configuration parameter including a BWP switching indicator (e.g., BWP ID); select resources from a target BWP indicated by the at least one configuration parameter; and determine a BWP mismatch based on whether the downlink signals include signaling using the target BWP.

Figure 7A:
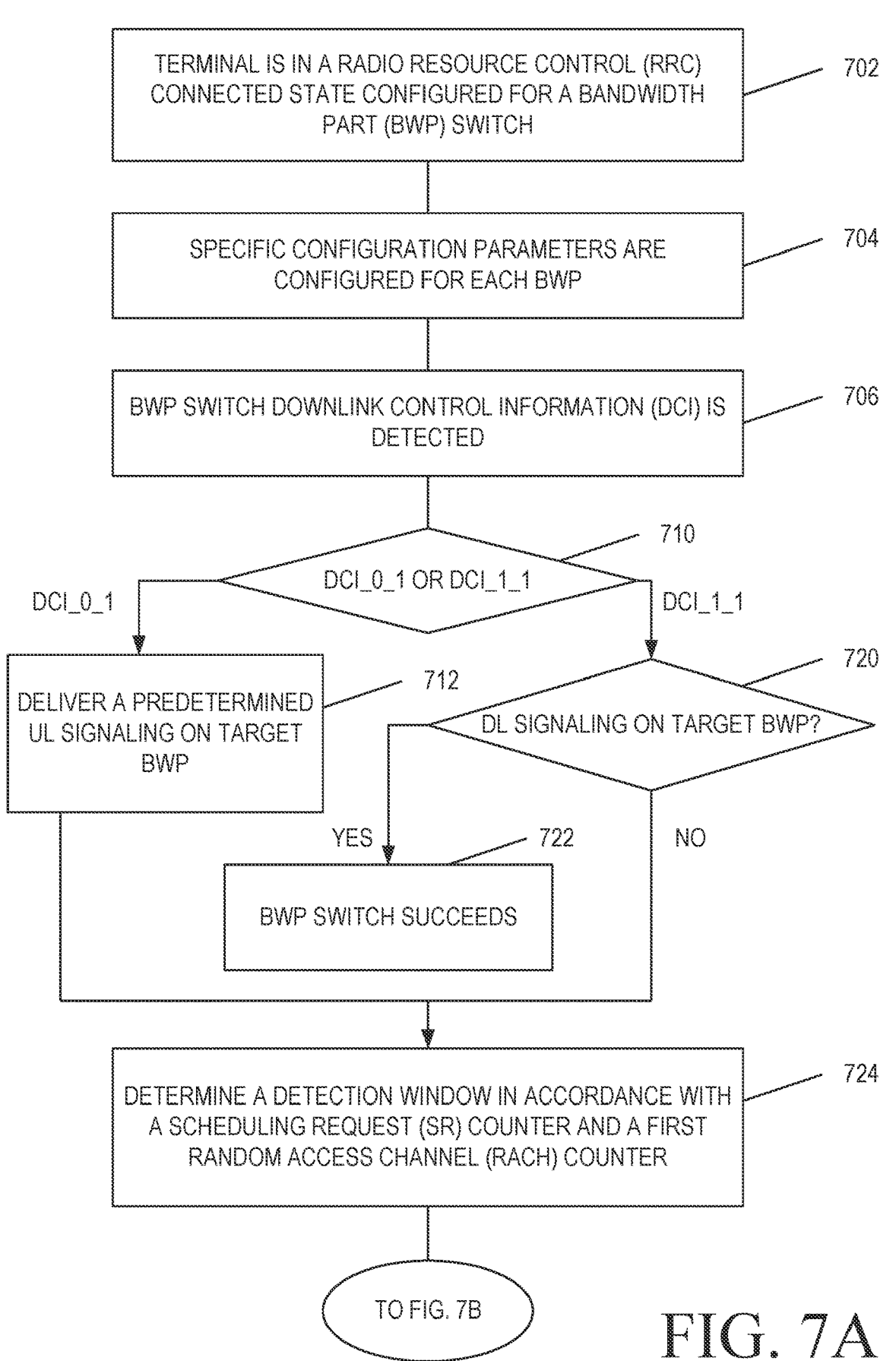
FIGS. 7A-7D are flowcharts detailing methods of switching between two BWPs, according to some aspects.

In the example of FIG. 7A, at 702, the flowchart begins with a terminal 520 that is in a Radio Resource Control (RRC) connected stat and configured for a BWP switch. In connected state, radio resources are allocated to the terminal

520 and typically active communication (user plane or control plane) is taking place between the terminal 520 and the network 510. Otherwise, the terminal 520 is in idle state.

At 704, the flowchart continues where the terminal 520 configures specific configuration parameters for each BWP. The network 510 may configure multiple BWPs for communication.

At 706, the flowchart continues where the terminal 520 detects a BWP switching indication via DCI in DL signaling from the network. As described above, in one or more embodiments, BWP switching may be performed using a dedicated RRC signaling; over a PDCCH/DCI UL Grant and/or DL Scheduling; based on a bwp-inactivityTimer and/or based on the MAC CE.

At 710, the flowchart continues where the terminal 520 determines a DCI format based on the DCI. In some embodiments, the DCI format 0_1 may be used for uplink grants and the DCI format 1_1 may be used for downlink assignment. These formats may contain a BWP indicator (e.g., BWP ID) that causes the terminal 520 to switch between BWPs. In the DCI, as described above, BWP ID indicates a target BWP. The terminal 520 may trigger BWP switching to the target BWP only if the target BWP ID is not the same as a current BWP ID (e.g., indicating the original BWP). Based on the determined DCI format, the flowchart continues to 712 or 720.

At 712, if the DCI format is determined to be DCI format 0_1, the terminal 520 delivers a predetermined UL signaling on the target BWP to the network 510. At this stage, because the DCI format 0_1 is used for uplink resource allocation (i.e., scheduling grants) for PUSCH, the terminal 520 engages the target BWP. In this case, the terminal 520 waits for an acknowledgement of the PUSCH to be received.

At 720, if the DCI format is determined to be DCI format 1_1, the terminal 520 determines a BWP mismatch detection operation corresponding to this format. At this stage, because the DCI format 1_1 is used for allocating downlink resources for PDSCH, the terminal 520 determines whether DL signaling is received on the target BWP. Specifically, the terminal 520 determines whether a corresponding PDSCH is detected on the target BWP.

At 722, if DL signaling is identified on the target BWP, the terminal 520 confirms that the BWP switching succeeded. The terminal 520 confirms that the DL signaling is received in reception signaling using the target BWP. As a result, a BWP mismatch has not occurred.

At 724, if no DL signaling is identified on the target BWP, the flowchart continues where the terminal 520 determines a detection window in accordance with a first RACH procedure counter. The detection window is determined as a function of a count number n using the BWP mismatch detection algorithm (BMDA) described in reference to FIG. 5. The detection window may be defined as a function F(n)=n_SR_MAX_Count+n_RACH_Max_Count, where n_SR_MAX_Count is the maximum detection SR count, where the n_RACH_MAX_Count is the maximum detection RACH count, and where F(n) is a dynamic algorithm configured to evaluate the BWP mismatch in the combination of SR counts and RACH procedure counts. The terminal 520 may configure the first RACH procedure counter and an SR procedure counter.

Figure 7B:
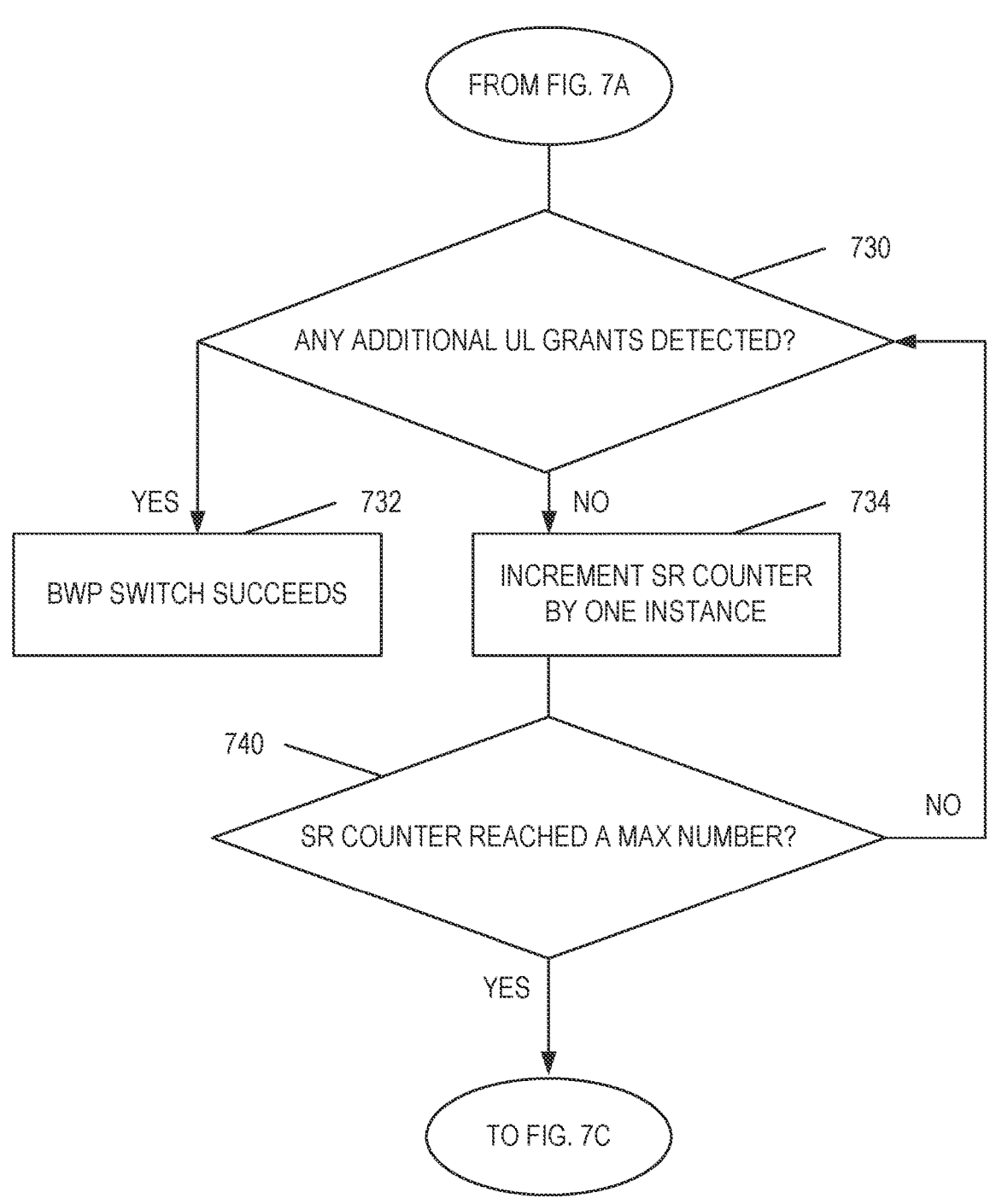

The flowchart continues in FIG. 7B. At 730, the terminal 520 determines whether any additional UL grants are detected. Specifically, the terminal 520 determines whether any following UL grants are detected after detection of the SR is triggered.

At 732, if any additional UL grants are detected, the terminal 520 confirms that the BWP switching succeeded. Specifically, the terminal 520 confirms that at least one additional UL grant has been received after triggering the SR detection. As a result, the terminal 520 may determine that a BWP mismatch has not occurred.

At 734, if no additional UL grants are detected, the terminal 520 increments the SR counter by one instance. Specifically, the value n_SR_Count may be increased by a value of one. The progression of this counter represents another iteration of expecting a UL grant before a maximum number of SRs is reached.

At 740, the flowchart continues where the terminal 520 determines whether the SR counter has reached a maximum number. In some embodiments, the terminal 520 may monitor whether the SR procedure counter is equal to a first predetermined number, and trigger a RACH procedure configured for detection when the SR procedure counter is equal to the first predetermined number. The first predetermined number may be the maximum number of SRs. At this point, the terminal 520 compares the values of n_SR_Count and n_SR_Max_Count to determine whether the maximum number has been reached. If the number has been reached, then the flowchart continues to 742 on FIG. 7C. Otherwise, the flowchart returns to 730 to check for a UL grant detection.

Figure 7C:
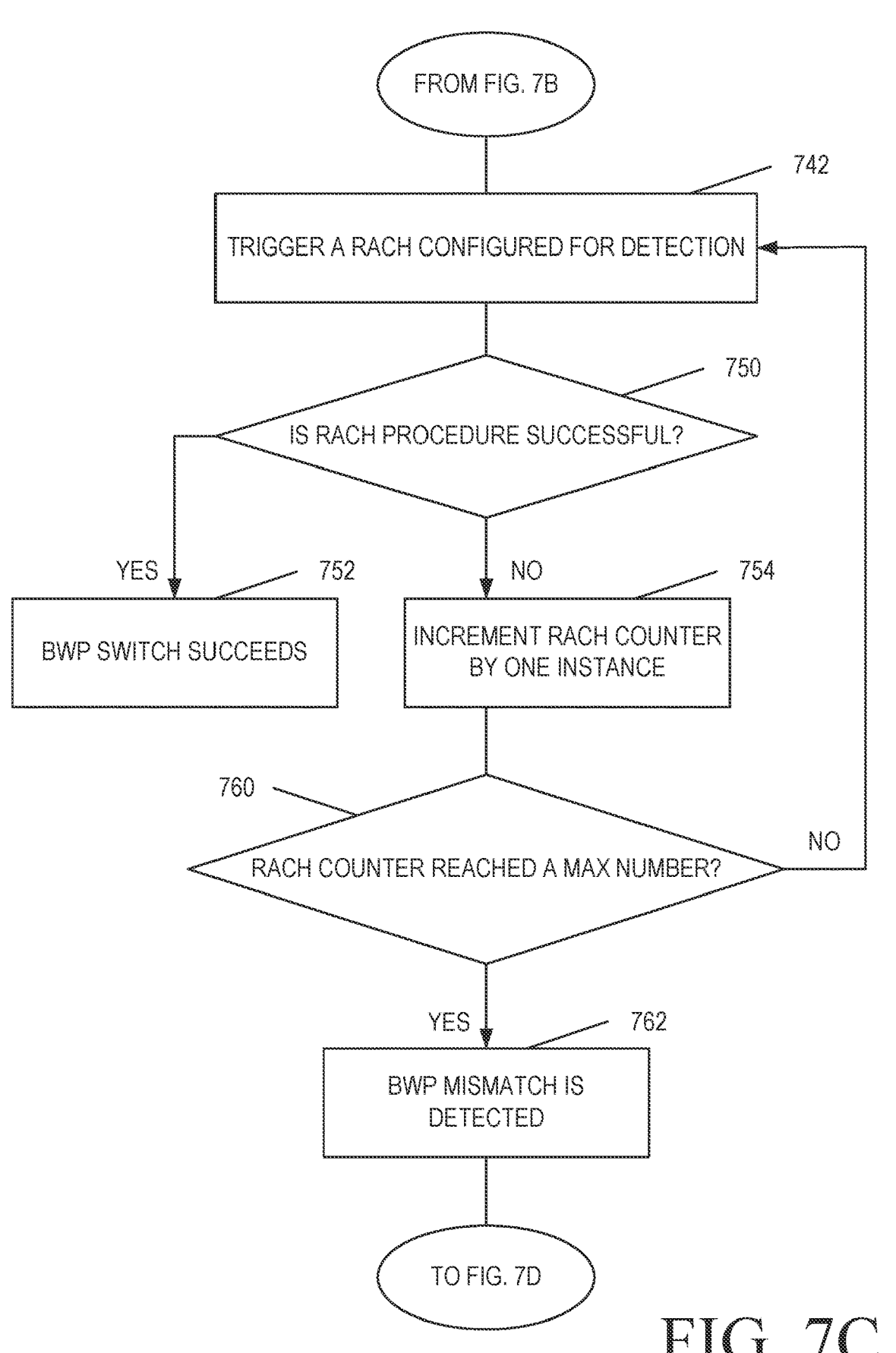

The flowchart continues in FIG. 7C. At 742, the terminal 520 triggers a RACH configured for detection. This detection RACH is configured on the target BWP to confirm whether there is a BWP mismatch between the network 510 and the terminal 510.

At 750, the terminal 520 determines whether the RACH procedure was successful. Specifically, the terminal 520 determines that an acknowledgement has been received from the network 510 on the target BWP.

At 752, if the RACH procedure is successful, the terminal 520 confirms that the BWP switching succeeded. Specifically, the terminal 520 confirms that the RACH procedure was successful using the target BWP. As a result, the terminal 520 may determine that a BWP mismatch has not occurred.

At 754, if the RACH procedure is not successful, the flowchart continues where the terminal increments the RACH procedure counter by one instance. Specifically, the value n_RACH_Count may be increased by a value of one. The progression of this procedure counter represents another iteration of expecting a successful RACH procedure before a maximum number of RACHs is reached.

At 760, the flowchart continues where the terminal 520 determines whether the RACH procedure counter has reached a maximum number. In some embodiments, terminal 520 may determine whether the first RACH procedure counter is equal to a second predetermined number, and determine a recovery window in accordance with the first RACH procedure counter. The recovery window may be determined in accordance with the BWP mismatch recovery algorithm (BMRA) described in reference to FIG. 5. The second predetermined number may be the maximum number of RACHs. At this point, the terminal 520 compares the values of n_RACH_Count and n_RACH_Max_Count to determine whether the maximum number has been reached. If the number has been reached, then the flowchart continues to 762. Otherwise, the flowchart returns to 742 to check for a successful RACH procedure.

At 762, if the RACH procedure counter reached a maximum number, the terminal 520 determines that a BWP mismatch has occurred. The terminal 520 determines that a reliable connection never occurred with the target BWP.

Figure 7D:
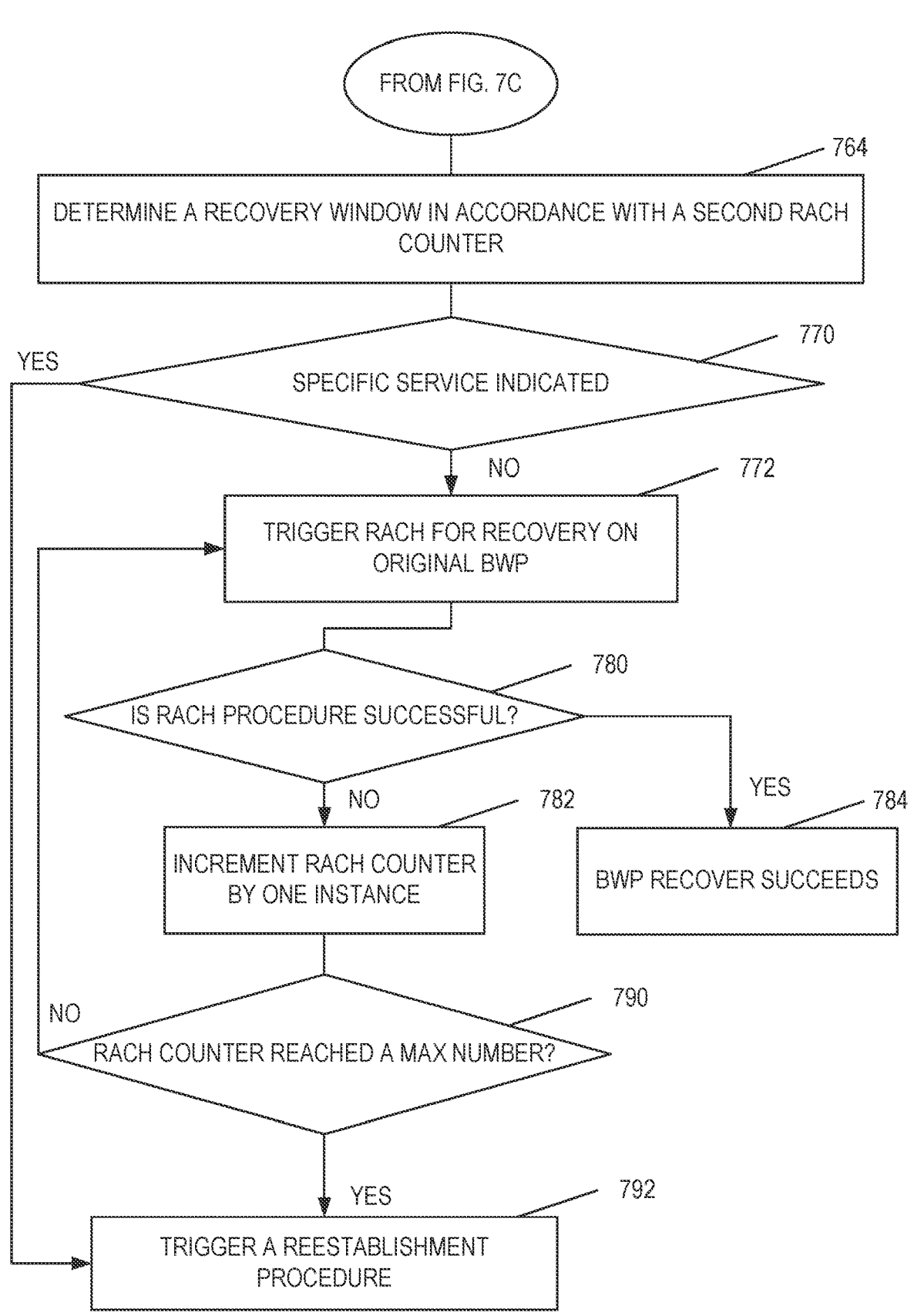

The flowchart continues in FIG. 7D. At 764, the flowchart continues where the terminal 520 determines a recovery window in accordance with a second RACH procedure counter. The recovery window is determined as a function of a count number m using the BWP mismatch recovery algorithm (BMRA) described in reference to FIG. 5. The recovery window may be defined as a function X(m) =m_RACH_MAX_Count, where m_RACH_MAX_Count is the maximum detection SR count and where X(m) is a dynamic algorithm configured to evaluate the BWP recovery in RACH procedure counts. The terminal 520 may configure a second RACH procedure counter.

At 770, the flowchart continues where the terminal 520 determines whether a specific service has been configured. The terminal 520 may be (pre-) configured in accordance with a specific service. The specific service may a service defined by the terminal 520, which may be time sensitive and require to recovery with a lower latency. For example, the terminal 520 may be configured with an online game application as the specific service. In this case, the specific service may cause the terminal 520 to perform the reestablishment procedure if a predefined amount of time has lapsed without switching to the target BWP. If a specific service is configured, the flowchart ends at 792. Otherwise, the flowchart proceeds to 772. In some embodiments, the terminal 520 determines whether to perform a reestablishment directly or a RACH recovery.

At 772, if the specific service is not indicated, the flowchart continues where the terminal 520 triggers a RACH to recover service in the original BWP. The terminal 520 uses the RACH to determine an acknowledgement in the original BWP.

At 780, the terminal 520 determines whether the RACH procedure was successful. Specifically, the terminal 520 determines that an acknowledgement has been received from the network 510 on the original BWP.

At 784, if the RACH procedure is successful, the flowchart proceeds where the terminal 520 confirms that the BWP recovery succeeded. Specifically, the terminal 520 confirms that the acknowledgement in response to the RACH is received in reception signaling using the original BWP. As a result, the terminal 520 may determine that a BWP recovery has been completed.

At 782, if the RACH procedure is not successful, the flowchart continues where the terminal increments the RACH procedure counter by one instance. Specifically, the value m_RACH_Count may be increased by a value of one. The progression of this procedure counter represents another iteration of expecting a successful RACH procedure before a maximum number of RACHs is reached.

At 790, the flowchart continues where the terminal 520 determines whether the RACH counter has reached a maximum number. In some embodiments, the terminal 520 may determine whether the second RACH procedure counter is equal to a third predetermined number, and trigger, based on whether the second RACH procedure counter is equal to the third predetermined number, a reestablishment procedure. At this point, the terminal 520 compares the values of m_RACH_Count and m_RACH_Max_Count to determine whether the maximum number has been reached. If the number has been reached, then the flowchart ends at 792. Otherwise, the flowchart returns to 772 to trigger another RACH for recovery on the original BWP.

The flowchart ends at 792, where the terminal 520 triggers a reestablishment procedure. The reestablishment procedure attempts to connect the terminal 520 with the original BWP. The reestablishment procedure may be implemented as described in TS 38.331 of the 3GPP standard. This may occur in response to the decision at 770 where the terminal 520 may determine that a specific service is indicated in the downlink signals, and may trigger a reestablishment procedure directly based on an indication of the specific service.

The use of the connective term "and/or" is meant to represent all possible alternatives of the conjunction "and" and the conjunction "or." For example, the sentence "configuration of A and/or B" includes the meaning and of sentences "configuration of A and B" and "configuration of A or B."

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method (e.g., any of a method aspects described herein, or, any combination of the method aspects described herein, or any subset of any of the method aspects described herein, or any combination of such subsets).

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A terminal, comprising: a receiver configured to receive, from a network, a plurality of downlink signals; and a processor configured to: identify, from the plurality of downlink signals, at least one configuration parameter including a bandwidth part switching indicator indicating a target bandwidth part;

identify, from the at least one configuration parameter, a first random access channel (RACH) procedure counter and a scheduling request (SR) procedure counter, wherein the first RACH procedure counter sets a maximum number of attempts to complete a RACH procedure successfully and the SR procedure counter sets a maximum number of attempts to detect an uplink (UL) grant after triggering an SR; trigger the SR on the target bandwidth part; attempt to detect, during a detection window and based on the SR procedure counter, the UL grant on the target bandwidth part; attempt, during the detection window, the RACH procedure on the target bandwidth part after failing to detect the UL grant within the maximum number of attempts set by the SR procedure counter; and determine a bandwidth part mismatch based on the UL grant not being detected on the target bandwidth part during the detection window and the RACH procedure not being completed successfully during the detection window.

2. The terminal of claim 1, wherein the processor is further configured to: determine, from the plurality of downlink signals, a type of a downlink communication information (DCI), and start, based on the type of the DCI, a preconfigured detection timer.

3. The terminal of claim 2, wherein the processor is further configured to:
   determine the detection window in accordance with a first function.

4. The terminal of claim 3, wherein the processor is further configured to: determine whether the plurality of downlink signals include a DCI before the detection window expires.

5. The terminal of claim 4, wherein the processor is further configured to: return, based on whether the DCI is received before the detection window expires, to an original bandwidth part that is different from the target bandwidth part.

6. The terminal of claim 5, wherein the processor is further configured to: determine a recovery window in accordance with a second function.

7. The terminal of claim 6, wherein the processor is further configured to: determine whether the plurality of downlink signals include the DCI before the recovery window expires.

8. The terminal of claim 7, wherein the processor is further configured to: trigger, based on whether the DCI is received before the recovery window expires, a reestablishment procedure.

9. The terminal of claim 1, wherein the processor is further configured to:
   identify, from the at least one configuration parameter, a second RACH procedure counter, wherein the second RACH procedure counter sets a predetermined number of attempts after which a reestablishment procedure will be triggered; determine that the second RACH procedure counter is equal to a the predetermined number of attempts; and trigger, based on the determination that the second RACH procedure counter is equal to the predetermined number of attempts, a reestablishment procedure.

10. The terminal of claim 1, wherein the processor is further configured to:
   determine whether a specific service is indicated in the plurality of downlink signals; and trigger a reestablishment procedure directly based on an indication of the specific service.

11. A non-transitory computer readable-medium including instructions that, when executed by at least one computer processor, cause the at least one computer processor to:

obtain a plurality of downlink signals; and identify, from the plurality of downlink signals, at least one configuration parameter including a bandwidth part switching indicator indicating a target bandwidth part;
   identify, from the at least one configuration parameter, a first random access channel (RACH) procedure counter and a scheduling request (SR) procedure counter, wherein the first RACH procedure counter sets a maximum number of attempts to complete a RACH procedure successfully and the SR procedure counter sets a maximum number of attempts to detect an uplink (UL) grant after triggering an SR; trigger the SR on the target bandwidth part; attempt to detect, during a detection window and based on the SR procedure counter, the UL grant on the target bandwidth part; attempt, during the detection window, the RACH procedure on the target bandwidth part after failing to detect the UL grant within the maximum number of attempts set by the SR procedure counter; and determine a bandwidth part mismatch based on the UL grant not being detected on the target bandwidth part during the detection window and the RACH procedure not being completed successfully during the detection window.

12. The non-transitory computer readable-medium of claim 11, wherein the instructions further cause the at least one computer processor to: determine, from the plurality of downlink signals, a type of a downlink communication information (DCI); and start, based on the type of the DCI, a preconfigured detection timer.

13. A method, comprising: receiving a plurality of downlink signals;
   identifying, from the plurality of downlink signals, at least one configuration parameter including a bandwidth part switching indicator indicating a target bandwidth part;
   identifying, from the at least one configuration parameter, a first random access channel (RACH) procedure counter and a scheduling request (SR) procedure counter, wherein the first RACH procedure counter sets a maximum number of attempts to complete a RACH procedure successfully and the SR procedure counter sets a maximum number of attempts to detect an uplink (UL) grant after triggering an SR; triggering the SR on the target bandwidth part; attempting to detect, during a detection window and based on the SR procedure counter, the UL grant on the target bandwidth part; attempting, during the detection window, the RACH procedure on the target bandwidth part after failing to detect the UL grant within the maximum number of attempts set by the SR procedure counter; and determining a bandwidth part mismatch based on the UL grant not being detected on the target bandwidth part during the detection window and the RACH procedure not being completed successfully during the detection window.

14. The method of claim 13, further comprising: determining, from the plurality of downlink signals, a type of a downlink communication information (DCI); and starting, based on the type of the DCI, a preconfigured detection timer.

* * * * *